United States Patent
Funatani

(10) Patent No.: US 10,488,782 B2
(45) Date of Patent: Nov. 26, 2019

(54) IMAGE FORMING APPARATUS

(71) Applicant: CANON KABUSHIKI KAISHA, Tokyo (JP)

(72) Inventor: Kazuhiro Funatani, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/023,841

(22) Filed: Jun. 29, 2018

(65) Prior Publication Data

US 2019/0011849 A1 Jan. 10, 2019

(30) Foreign Application Priority Data

Jul. 7, 2017 (JP) ................................. 2017-134183

(51) Int. Cl.
| | |
|---|---|
| *G03G 15/00* | (2006.01) |
| *G03G 15/043* | (2006.01) |
| *H04N 1/29* | (2006.01) |
| *H04N 1/00* | (2006.01) |

(52) U.S. Cl.
CPC ....... *G03G 15/043* (2013.01); *G03G 15/5037* (2013.01); *H04N 1/00899* (2013.01); *H04N 1/00997* (2013.01); *H04N 1/295* (2013.01)

(58) Field of Classification Search
CPC ............. G03G 15/043; G03G 15/5037; H04N 1/00899; H04N 1/00997; H04N 1/295
See application file for complete search history.

(56) References Cited

U.S. PATENT DOCUMENTS

| | | | | |
|---|---|---|---|---|
| 5,410,339 A | * | 4/1995 | Bisaiji | ..................... B41J 2/471 347/140 |
| 6,477,339 B1 | * | 11/2002 | Yano | .................. G03G 15/0131 399/302 |
| 7,263,299 B2 | * | 8/2007 | Nagamochi | ........ G03G 15/5037 399/26 |
| 8,543,021 B2 | | 9/2013 | Sakata et al. | |
| 9,665,043 B2 | | 5/2017 | Funatani et al. | |
| 2002/0168195 A1 | * | 11/2002 | Yokogawa | ........... G03G 15/043 399/51 |
| 2011/0069979 A1 | * | 3/2011 | Yamada | ............. G03G 15/1605 399/44 |

FOREIGN PATENT DOCUMENTS

JP 2012-013881 A 1/2012

* cited by examiner

*Primary Examiner* — Rodney A Bonnette
(74) *Attorney, Agent, or Firm* — Venable LLP

(57) ABSTRACT

An image forming apparatus includes a detecting unit detecting a value of a current flowing to a photosensitive member when a voltage is supplied to a voltage applying member or a value of a voltage applied to the photosensitive member when a current is supplied to the voltage applying member, an acquiring unit acquiring information concerning a difference between potentials of the unexposed portion and the exposed portion, based on detection results of the detecting unit at times when the voltage is applied by the voltage applying member to each of an unexposed portion formed in a region chargeable by a charging member in a rotation axis direction of the photosensitive member and an exposed portion formed in a region exposable by the exposure device in the rotation axis direction of the photosensitive member, and a control unit controlling an image forming condition based on the information concerning the difference.

16 Claims, 11 Drawing Sheets

IMAGE FORMING APPARATUS

BACKGROUND OF THE INVENTION

Field of the Invention

The present invention relates to image forming apparatuses such as a copying machine, a printer and a facsimile apparatus using an electrophotographic process.

Description of the Related Art

An image forming apparatus using the electrophotographic process uniformly charges the surface of a photosensitive member, exposes the uniformly charged surface of the photosensitive member according to image information to form an electrostatic image on the photosensitive member, and deposits toner on the electrostatic image to form a toner image. In the image forming apparatus, to stabilize image density and tone reproduction irrespective of an elapse of time and environmental fluctuation, it is important to control the surface potential of the photosensitive member. However, it is known that the surface potential of the photosensitive member changes according to characteristics of the photosensitive member such as the film thickness of a photosensitive layer or an atmospheric environment. Therefore, the surface potential of the photosensitive member is measured and an image forming condition is controlled to appropriately adjust the surface potential of the photosensitive member irrespective of the elapse of time and the environmental fluctuation. As a target that should be controlled, there is "latent image contrast", which is a potential difference between the potential of an unexposed portion and the potential of an exposed portion of the photosensitive member.

In recent years, as means for enlarging a color gamut, there has been proposed a method of increasing an output of an exposure device and increasing the latent image contrast to increase an amount of toner adhering to the exposed portion of the photosensitive member. In the method, a relation between an amount of increase in the output of the exposure device and an amount of change in the latent image contrast fluctuates according to the characteristics of the photosensitive member such as the film thickness of the photosensitive layer or the atmospheric environment. Therefore, when the output of the exposure device uniformly increases, an amount of increase in the latent image contrast cannot be stabilized. It is likely that insufficiency of an effect of a color gamut enlargement mode occurs because the amount of the toner adhering to the exposed portion of the photosensitive member increases less than expected and transfer failure or fixing failure occurs because the amount of the toner adhering to the exposed portion of the photosensitive member increases more than expected.

Japanese Patent Application Laid-Open No. 2012-013881 proposes a method of applying a voltage having a positive polarity and a voltage having a negative polarity to a charging member and calculating respective discharge start voltages on the positive polarity side and the negative polarity side to calculate potential of an exposed portion of a photosensitive member. In this method, a light amount of an exposure device is controlled such that the potential of the exposed portion reaches a desired value.

However, in the method of calculating the potential of the exposed portion, it is necessary to calculate the discharge start voltages on both of the positive polarity side and the negative polarity side. It is necessary to apply a voltage having a polarity different from a polarity during normal image formation to the charging member. That is, both of a power supply that outputs the voltage having the positive polarity and a power supply that outputs the voltage having the negative polarity are necessary. This causes an increase in the size, an increase in the cost or an increase in a control time of an apparatus.

Therefore, the present invention provides an image forming apparatus that can acquire information concerning latent image contrast with a simple configuration in a relatively short time and control an image forming condition.

SUMMARY OF THE INVENTION

According to an aspect of an embodiment, there is provided an image forming apparatus including: a photosensitive member; a charging member configured to charge the photosensitive member to form an unexposed portion on the photosensitive member; an exposure device configured to expose the photosensitive member charged by the charging member to form an exposed portion on the photosensitive member; a voltage applying member configured to apply a voltage to the photosensitive member; a detecting unit configured to detect a value of a current flowing to the photosensitive member when a voltage is supplied to the voltage applying member or a value of a voltage applied to the photosensitive member when a current is supplied to the voltage applying member; an acquiring unit configured to acquire information concerning a difference between potential of the unexposed portion and potential of the exposed portion, based on detection results of the detecting unit at times when the voltage is applied by the voltage applying member to each of the unexposed portion formed in a region chargeable by the charging member in a rotation axis direction of the photosensitive member and the exposed portion formed in a region exposable by the exposure device in the rotation axis direction of the photosensitive member; and a control unit configured to change an image forming condition based on the information concerning the difference.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

An image forming apparatus according to the present invention is described more in detail below with reference to the drawings.

First Embodiment

1. Overall Configuration and Operation of an Image Forming Apparatus

Figure 1:
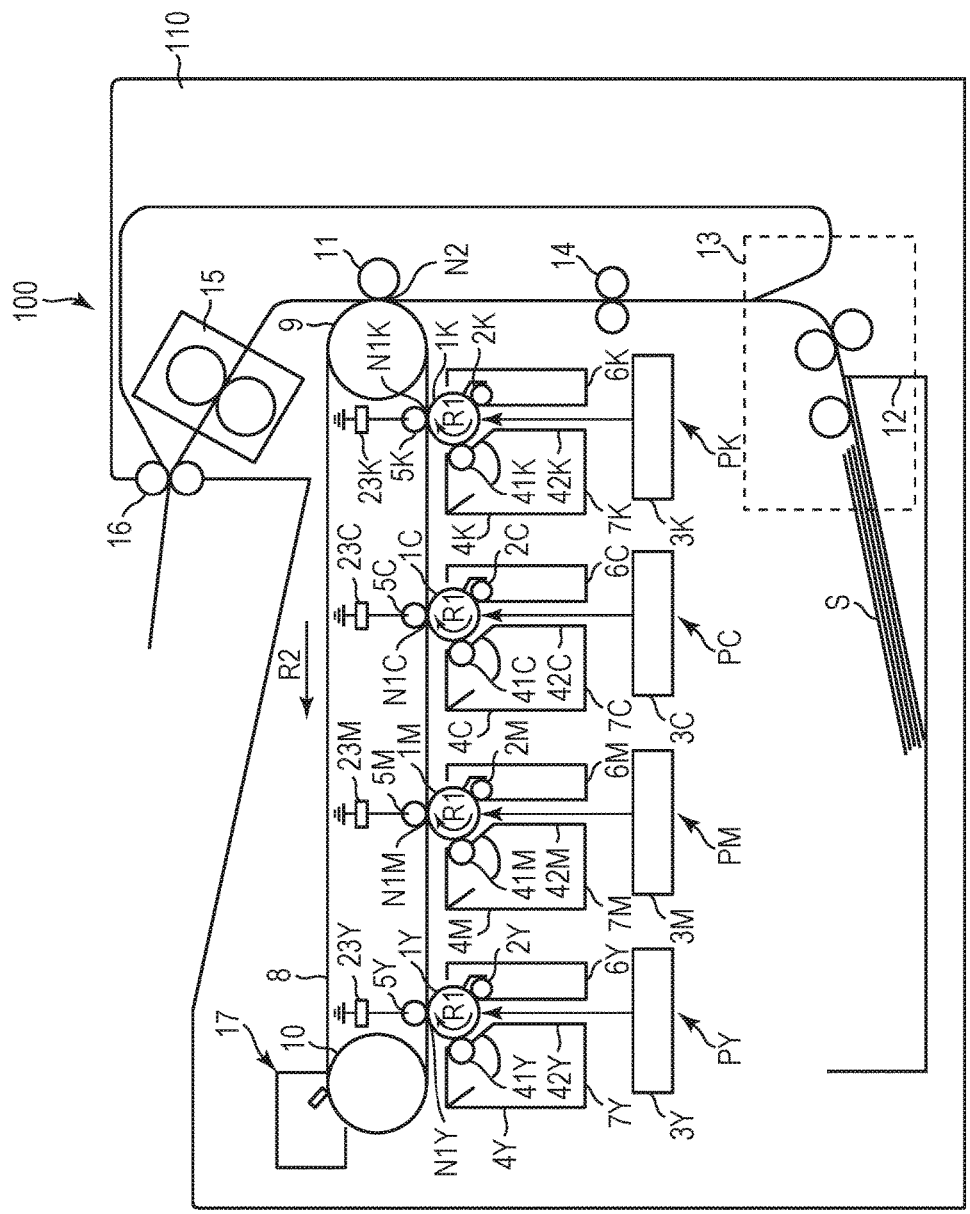
FIG. 1 is a schematic sectional view of an image forming apparatus.

FIG. 1 is a schematic sectional view of an image forming apparatus 100 in this embodiment. The image forming apparatus 100 in this embodiment is a laser beam printer of a tandem type (an inline system) adopting an intermediate transfer system that can form a full color image using an electrophotographic process.

The image forming apparatus 100 includes, as a plurality of image forming units (stations), a first image forming unit PY, a second image forming unit PM, a third image forming unit PC and a fourth image forming unit PK that respectively form images of colors of yellow, magenta, cyan and black. Elements having the same or corresponding functions or configurations in the image forming units PY, PM, PC and PK are sometimes collectively described by omitting Y, M, C and K at the ends of signs indicating for which colors the elements are used. In this embodiment, the image forming unit P includes a photosensitive drum 1, a charging roller 2, an exposure device 3, a developing device 4, a primary transfer roller 5 and a drum cleaning device 6.

The image forming apparatus 100 includes the photosensitive drum 1, which is a drum-type (cylindrical) photosensitive member (an electrophotographic photosensitive member) functioning as a movable (rotatable) image bearing member. In this embodiment, the photosensitive drum 1 is an organic photosensitive member having a negative chargeability. The photosensitive drum 1 includes a photosensitive layer on a drum-like substrate made of aluminum. The photosensitive drum 1 is driven to rotate at predetermined peripheral speed (process speed) in an arrow R1 direction in FIG. 1 (clockwise) by a driving device (not illustrated in FIG. 1) functioning as a driving unit. The surface of the rotating photosensitive drum 1 is uniformly charged to predetermined potential having a predetermined polarity (in this embodiment, a negative polarity) by the charging roller 2, which is a roller-type charging member functioning as a charging member. The charging roller 2 is set in contact with the photosensitive drum 1 with predetermined pressure. The charging roller 2 rotates following the rotation of the photosensitive drum 1. During a charging process, a charging voltage (a charging bias), which is a DC voltage having a predetermined polarity (in this embodiment, a negative polarity), is applied to the charging roller 2 by a charging power supply (a high-voltage power supply circuit) 21 (FIG. 2) functioning as a charging-voltage supply unit. As the charging voltage, a vibration voltage obtained by superimposing a DC voltage and an AC voltage may be used. The charged surface of the photosensitive drum 1 is scanned and exposed according to image information by the exposure device 3 functioning as an exposing unit. An electrostatic image (an electrostatic latent image) is formed on the photosensitive drum 1. In this embodiment, the exposure device 3 is a laser scanner device. The exposure device 3 outputs a laser beam corresponding to image information from a laser beam source and irradiates the surface of the photosensitive drum 1 with the laser beam.

Toner functioning as a developer is supplied to the electrostatic image formed on the photosensitive drum 1 by the developing device 4 functioning as a developing unit and the electrostatic image is developed (visualized). A toner image is formed on the photosensitive drum 1. In this embodiment, a contact development system is adopted in the developing device 4. The developing device 4 includes a developing roller 41 functioning as a developer carrying member and a developing container 42 that stores the toner. The developing roller 41 carries the toner stored in the developing container 42 and conveys the toner to an opposed section (a developing section) opposed to the photosensitive drum 1. In the developing section, the developing roller 41 carrying the toner comes into contact with the surface of the photosensitive drum 1 and deposits the toner on the surface of the photosensitive drum 1 according to the electrostatic image formed on the photosensitive drum 1. During a developing process, a developing voltage (a developing bias), which is a vibration voltage obtained by superimposing a DC voltage and an AC voltage having a predetermined polarity (in this embodiment, a negative polarity), is applied to the developing roller 41 by a developing power supply (a high-voltage power supply circuit) 22 (FIG. 2) functioning as a development-voltage supply unit. In this embodiment, the toner charged to the same polarity (in this embodiment, a negative polarity) as a charging polarity of the photosensitive drum 1 adheres to the exposed portion on the photosensitive drum 1, the absolute value of the potential of which decreases because the photosensitive drum 1 is exposed after being uniformly charged, (reversal development). Yellow, magenta, cyan and black toners are respectively stored in the developing devices 4Y, 4M, 4C and 4K. In this embodiment, all the color toners are toners having an average particle diameter of 6 μm and having a negative polarity as a regular charging polarity (a charging polarity during development). The developing roller 41 and the photosensitive drum 1 can be switched to a contact state or a separated state as appropriate by a contact/separation mechanism (not illustrated in FIG. 1) functioning as a contact/separation unit.

An intermediate transfer belt 8 configured by an endless belt functioning as an intermediate transfer member is disposed to be opposed to all the photosensitive drums 1. As the intermediate transfer belt 8, a single layer configuration obtained by forming resin in an endless belt shape can be used. As the resin, resin obtained by adjusting electric resistance of PEN (polyethylene naphthalate), PVdF (vinylidene fluoride resin), ETFE (ethylene tetrafluoride-ethylene copolymer resin), polyimide, PET (polyethylene terephthalate), or polycarbonate to volume resistivity of approximately $1 \times 10^{10}$ Ω·cm can be used. A multilayer configuration formed in an endless belt shape by providing, for example, an acrylic coat layer on the surface of a base layer formed of resin can also be used. The intermediate transfer belt 8 is laid over a driving roller 9 and a tension roller 10 functioning as a plurality of supporting members (support rollers) and is looped around at predetermined tension. The driving roller 9 is driven to rotate by a driving device (not illustrated in FIG. 1) functioning as a driving unit, whereby the intermediate transfer belt 8 rotates (circumferentially moves) in an arrow R2 direction in FIG. 1 (counterclockwise) at substantially the same peripheral speed as the peripheral speed of the photosensitive drum 1. On the inner circumferential surface side of the intermediate transfer belt 8, a primary transfer roller 5, which is a roller-type primary transfer member functioning as primary transfer means, is disposed to correspond to each photosensitive drum 1. In this embodiment, the primary transfer roller 5 is disposed in a position opposed to the photosensitive drum 1 via the intermediate transfer belt 8. As the primary transfer roller 5, a roller formed by providing an elastic layer (an elastic member) on the outer circumference of a core bar (a supporting body) can be used. As the material of the elastic layer, sponge (foamed elastic body) formed of polyurethane rubber, EPDM (ethylene propylene diene) or NBR (nitrile-butadiene rubber) can be used. The primary transfer roller 5 is urged toward the photosensitive drum 1 via the intermediate transfer belt 8, presses the intermediate transfer belt 8 toward the photosensitive drum 1, and forms a primary transfer section (a primary transfer nip) N1 where the photosensitive drum 1 and the intermediate transfer belt 8 are in contact. That is, the primary transfer roller 5 is brought into contact with the photosensitive drum 1 via the intermediate transfer belt 8. The primary transfer roller 5 rotates following the rotation of the intermediate transfer belt 8. The primary transfer roller 5 and the photosensitive drum 1 can be switched to a contact state or a separated state as appropriate by a contact/separation mechanism (not illustrated in FIG. 1) functioning as a contact/separation unit. When the primary transfer roller 5 is separated from the photosensitive drum 1, the intermediate transfer belt 8 is separated from the photosensitive drum 1.

In the primary transfer section N1, the toner image formed on the photosensitive drum 1 is transferred (primarily transferred) onto the rotating intermediate transfer belt 8 functioning as a transfer body by the action of the primary transfer roller 5. During a primary transfer process, a primary transfer voltage (a primary transfer bias), which is a DC voltage having a polarity (in this embodiment, a positive polarity) opposite to a regular charging polarity of the toner, is applied to the primary transfer roller 5 by a primary transfer power supply (a high-voltage power supply circuit) 23 functioning as a primary transfer voltage supply unit. For example, during formation of a full color image, toner images of the colors of yellow, magenta, cyan and black formed on the photosensitive drums 1Y, 1M, 1C and 1K are sequentially transferred to be superimposed on the intermediate transfer belt 8.

On the outer circumferential surface of the intermediate transfer belt 8, a secondary transfer roller 11, which is a roller-type secondary transfer member functioning as a secondary transfer unit, is disposed in a position opposed to the driving roller 9 functioning as a secondary transfer counter roller as well. The secondary transfer roller 11 is pressed toward the driving roller 9 via the intermediate transfer belt 8 and forms a secondary transfer section (a secondary transfer nip) N2 where the intermediate transfer belt 8 and the secondary transfer roller 11 are in contact. That is, the secondary transfer roller 11 is in contact with the driving roller 9 via the intermediate transfer belt 8. The secondary transfer roller 11 and the intermediate transfer belt 8 can be switched to a contact state or a separated state as appropriate by a contact/separation mechanism (not illustrated in FIG. 1) functioning as a contact/separation unit. In the secondary transfer section N2, the toner image formed on the intermediate transfer belt 8 is transferred (secondarily transferred) onto a transfer material S such as a recording sheet, which is nipped by the intermediate transfer belt 8 and the secondary transfer roller 11 and conveyed, by the action of the secondary transfer roller 11. During a secondary transfer process, a secondary transfer voltage (a secondary transfer bias), which is a DC voltage having a polarity (in this embodiment, a positive polarity) opposite to the regular charging polarity of the toner, is applied to the secondary transfer roller 11 by a secondary transfer power supply (a high-voltage power supply circuit) 24 functioning as a secondary transfer voltage supply unit.

The transfer material S is fed from a cassette 12 functioning as a storing unit by a paper feeding unit 13 and conveyed to a registration roller 14. The transfer material S is supplied to the secondary transfer section N2 to be timed to coincide with the toner image on the intermediate transfer belt 8 by the registration roller 14. The transfer material S, on which the toner image is transferred, is heated and pressurized by a fixing device 15 functioning as a fixing unit, whereby the toner image is fixed (melted and fixed). Thereafter, the transfer material S is discharged (output) to the outside of an apparatus main body 110 of the image forming apparatus 100 by a discharge roller 16.

The toner remaining on the surface of the photosensitive drum 1 during the primary transfer (primary transfer residual toner) is removed from the surface of the photosensitive drum 1 and collected by a drum cleaning device 6 functioning as a photosensitive member cleaning unit. On the outer circumferential surface side of the intermediate transfer belt 8, a belt cleaning device 17 functioning as an intermediate transfer member cleaning unit is disposed in a position opposed to the tension roller 10. The belt cleaning device 17 removes the toner remaining on the surface of the intermediate transfer belt 8 during the secondary transfer (secondary transfer residual toner) from the surface of the intermediate transfer belt 8 and collects the toner.

In this embodiment, in each image forming unit P, the photosensitive drum 1 and the charging roller 2, the developing device 4, and the drum cleaning device 6 functioning as a process unit acting on the photosensitive drum 1 integrally configure a process cartridge 7 detachably attachable to the apparatus main body 110. The process cartridge 7 is replaced with a new product, for example, when the toner in the developing device 4 is exhausted or the photosensitive drum 1 exhausts a life.

In this embodiment, in a rotation axis direction (a direction substantially orthogonal to a moving direction of the surface) of the photosensitive drum 1, a length L2 of a region on the photosensitive drum 1, which can be charged by the charging roller 2, is smaller than a length L1 of the photosensitive drum 1. In the direction, a length L3 of a region on the photosensitive drum 1, to which a voltage can be applied by the primary transfer roller 5, is smaller than the length L2. In the direction, a length L4 of a region on the photosensitive drum 1, which can be exposed by the exposure device 3, is smaller than the length L3. These regions are disposed such that the regions relatively having smaller lengths are housed on the inner side of the regions relatively having larger lengths.

2. Control Form

Figure 2:
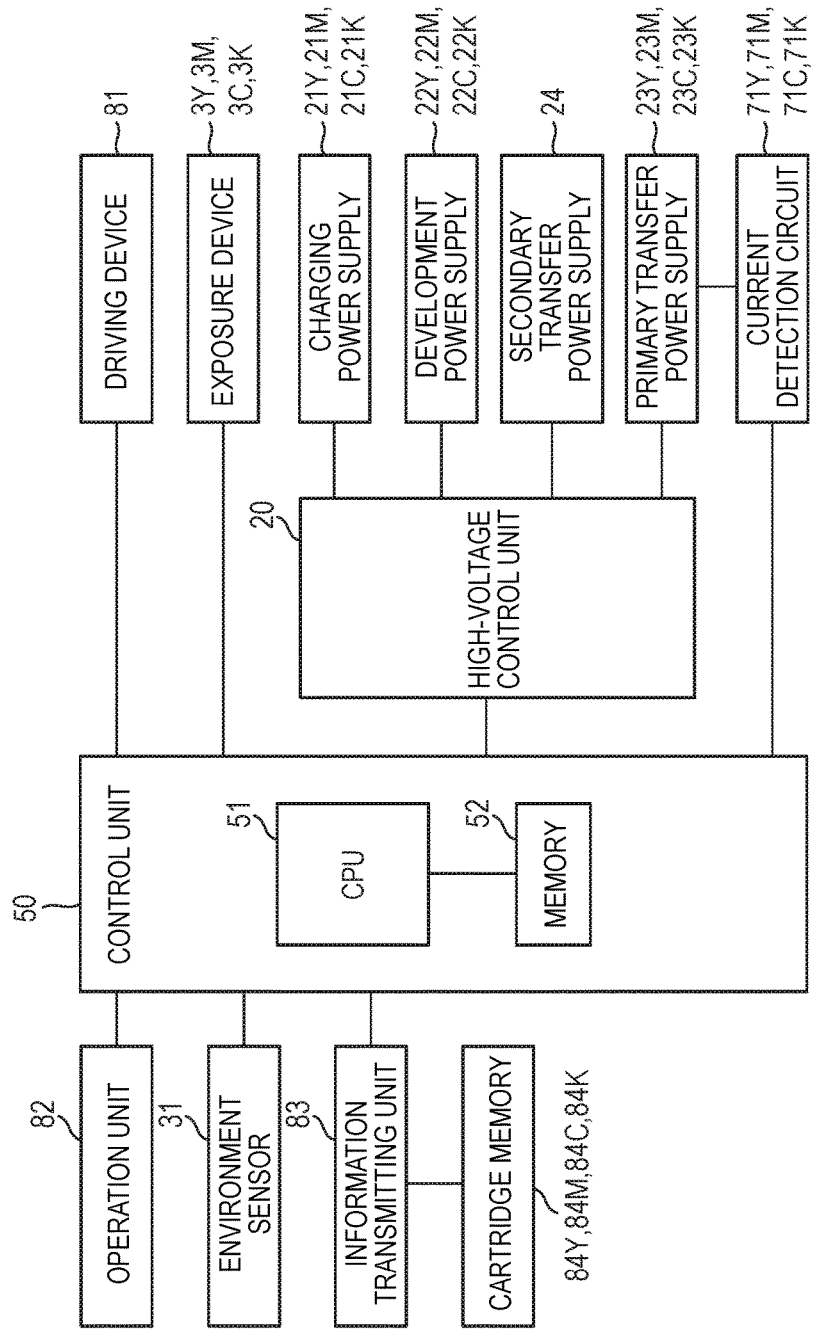
FIG. 2 is a schematic block diagram illustrating a control form of a main part of the image forming apparatus.

FIG. 2 is a schematic block diagram illustrating a control form of a main part of the image forming apparatus 100 in this embodiment. In the apparatus main body 110 of the image forming apparatus 100, a control unit (a control circuit unit) 50 functioning as a controlling unit is provided. The control unit 50 includes a CPU 51 functioning as an arithmetic controlling unit and a memory 52 configured by a ROM or a RAM functioning as a memory unit. The CPU 51 collectively controls the operation of the units of the image forming apparatus 100 according to a program stored in the memory 52. In this embodiment, the control unit 50 is capable of performing, via an information transmitting unit 83 provided in the apparatus main body 110, reading and writing of information on a cartridge memory 84 functioning as a memory unit provided in the process cartridge 7.

For example, a driving device 81, which drives the photosensitive drum 1 and the intermediate transfer belt 8, a high-voltage control unit 20, and the exposure device 3 are connected to the control unit 50. The charging power supply 21, the developing power supply 22, the primary transfer power supply 23, and the secondary transfer power supply 24 are connected to the control unit 50 via the high-voltage control unit 20. The high-voltage control unit 20 drives the power supplies 21 to 24 under the control by the control unit 50 and causes the power supplies 21 to 24 to respectively output a charging voltage, a developing voltage, a primary transfer voltage and a secondary transfer voltage. A current detection circuit 71 functioning as a current detecting unit is connected to the control unit 50. The current detection circuit 71 detects a value of a current flowing to the primary transfer power supply 23 (a current flowing to the photosensitive drum 1) when a voltage is supplied to the primary transfer roller 5 functioning as a voltage applying member by the primary transfer power supply 23. The control unit 50 can function as a voltage detecting unit and detect, from a setting value of an output voltage of the primary transfer power supply 23 retained by the high-voltage control unit 20, a value of a voltage supplied to the primary transfer roller 5 (a voltage applied to the photosensitive drum 1) by the primary transfer power supply 23. Although not illustrated in FIG. 2, in this embodiment, the primary transfer power supply 23 and the current detection circuit 71 are respectively independently provided for each of the image forming units PY, PM, PC and PK. The control unit 50 can change a light amount of the exposure device 3 by controlling a laser driving circuit of the exposure device 3 to change a driving signal input to the laser beam source. The control unit 50 can change outputs of the power supplies 21 to 24 by controlling the high-voltage control unit 20 to change setting of output voltages of the power supplies 21 to 24.

An environment sensor (a temperature/humidity sensor) 31 that detects temperature and humidity on the inside of the apparatus main body 110 is connected to the control unit 50 as an environment detecting unit for detecting at least one of temperature and humidity on at least one of the inside and the outside of the apparatus main body 110. An operation unit 82 provided in the apparatus main body 110 is connected to the control unit 50. In the operation unit 82, keys functioning as an input unit for inputting various kinds of setting concerning image formation to the control unit 50 and a display panel functioning as a display unit for displaying information to a user and an operator such as a person in charge of service are provided. The control unit 50 can function as a new product detecting unit, recognize that predetermined information is stored or not stored in the cartridge memory 84, and detect whether the process cartridge 7 is a new product. That is, in this embodiment, when use of the process cartridge 7 is started, the control unit 50 writes the predetermined information in the cartridge memory 84 with the information transmitting unit 83. Therefore, the control unit 50 can detect that the process cartridge 7 is a new product by recognizing that the predetermined information is not stored in the cartridge memory 84 by the information transmitting unit 83.

The image forming apparatus 100 executes a job (a print operation), which is a series of operation for forming an image on a single or a plurality of transfer materials S and outputting the image, started by one start instruction. In general, the job includes an image forming process, a pre-rotation process, a head gap process in forming images on the plurality of transfer materials S, and a post-rotation process. The image forming process is a period in which formation of an electrostatic latent image of an image actually formed on the transfer material S and output, formation of a toner image, and primary transfer of the toner image and secondary transfer of the toner image are performed. An image forming time refers to this period. More in detail, timings of the image forming time are different in positions where processes of the formation of an electrostatic latent image, the formation of a toner image, and the primary transfer of the toner image and the secondary transfer of the toner image are performed. The pre-rotation process is a period in which a preparation operation before the image forming process is performed from an input of a start instruction until an image is actually started to be formed. The head gap process is a period corresponding to an interval between the transfer material S and the transfer material S in continuously performing image formation on the plurality of transfer materials S (continuous image formation). The post-rotation process is a period in which an arrangement operation (a preparation operation) after the image forming process is performed. A non-image forming time is a period other than the image forming time and includes the pre-rotation process, the head gap process and the post-rotation process and further includes a pre-rotation process, which is a preparation operation during power-on of the image forming apparatus 100 or during return from a sleep state. In this embodiment, an adjusting operation is executed during the non-image forming time.

3. Overview of an Adjusting Operation for an Image Forming Condition

An adjusting operation for an image forming condition in this embodiment is described. In this embodiment, the image forming apparatus 100 measures "latent image contrast", which is a potential difference between the potential of the unexposed portion and the potential of the exposed portion of the photosensitive drum 1. The image forming apparatus 100 executes an adjusting operation for controlling the light amount of the exposure device 3 (an output of a laser) as an image forming condition.

In this embodiment, a voltage is applied to each of the unexposed portion and the exposed portion on the photosensitive drum 1 by the primary transfer roller 5 functioning as a voltage applying member and a relation between a current value and a voltage value is calculated. At this time, in this embodiment, a voltage supplied from the primary transfer power supply 23 to the primary transfer roller 5 is constant-voltage-controlled. That is, when the surface potential of the photosensitive drum 1 is different, a potential difference between the surface of the photosensitive drum 1 and the primary transfer roller 5 is different when the same voltage is applied by the primary transfer roller 5. Therefore, the relation between the current value and the voltage value deviates by the difference of the surface potential of the photosensitive drum 1. Therefore, the voltage is applied to each of the unexposed portion and the exposed portion as a part of a plurality of surface potentials on the photosensitive drum 1 by the primary transfer roller 5 and relations between current values and voltage values are calculated respectively in the unexposed portion and the exposed portion. Consequently, deviation between the relations between the current values and the voltage values can be measured. This deviation corresponds to latent image contrast, which is a potential difference between the potential of the unexposed portion and the potential of the exposed portion on the photosensitive drum 1. Therefore, the latent image contrast can be measured based on the deviation. The light amount of the exposure device 3 can be controlled based on a measurement result of the latent image contrast such that desired latent image contrast can be obtained.

In this embodiment, the image forming apparatus 100 executes, at predetermined timing, at the non-image forming time, an adjusting operation for measuring latent image contrast and controlling the light amount of the exposure device 3. Consequently, the image forming apparatus 100 controls the light amount of the exposure device 3 such that a predetermined target value (referred to as "target latent image contrast" as well) Ct set in advance for each image forming unit P (or process cartridge 7) can be obtained. In this embodiment, the target latent image contrast Ct is calculated by an experiment in advance to obtain appropriate image density and stored in the cartridge memory 84. Execution timing of the adjusting operation is further described below.

4. Procedure of the Adjusting Operation

Figure 3:
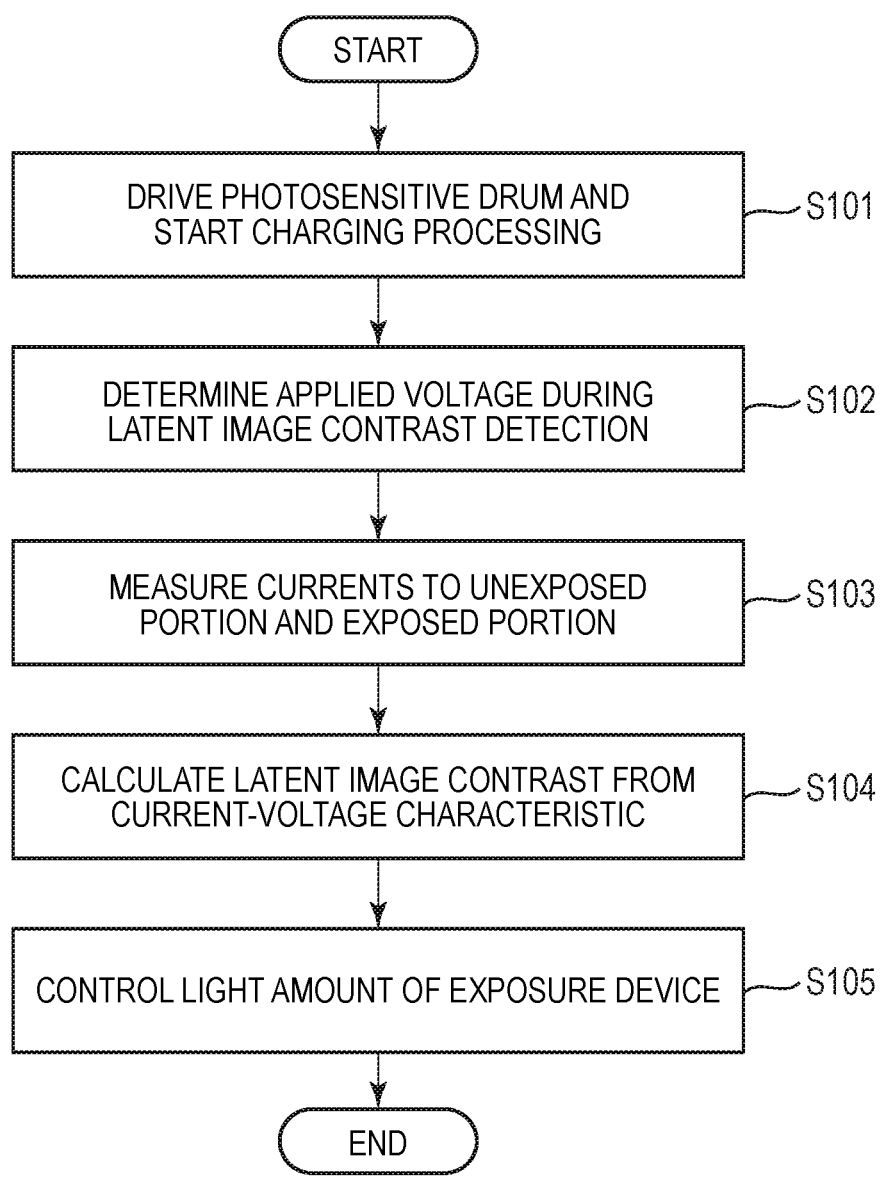
FIG. 3 is a flowchart illustrating an overview of a procedure of an adjusting operation.

A procedure of the adjusting operation in this embodiment is described. FIG. 3 is a flowchart illustrating an overview of the procedure of the adjusting operation in this embodiment. In this embodiment, control of the procedure is performed by the control unit 50. In this embodiment, because the procedure of the adjusting operation in the image forming units P is substantially the same, the procedure of the adjusting operation is described focusing on one image forming unit P.

4-1. Latent-Image-Contrast Detection Control

First, latent-image-contrast detection control in the adjusting operation is described. The latent-image-contrast detection control corresponds to processing in S101 to S104 in the procedure illustrated in FIG. 3.

Variable names used in this control are defined as follows.

Vi (i=1 to 3): A voltage applied to the photosensitive drum 1 by the primary transfer roller 5 in this control. The voltage is constant-voltage-controlled. In Vi, i is a number designating voltages. Note that, in this embodiment, the voltage Vi is set to be a voltage equal to or higher than a discharge start voltage at which electric discharge to the photosensitive drum 1 occurs.

Di (i=1 to 3): A current flowing to the primary transfer power supply 23 (a current flowing to the photosensitive drum 1) when the voltage Vi is applied to the unexposed portion on the photosensitive drum 1.

ILi (i=1 to 3): A current flowing to the primary transfer power supply 23 (a current flowing to the photosensitive drum 1) when the voltage Vi is applied to the exposed portion on the photosensitive drum 1.

First, when execution timing for the adjusting operation comes, the control unit 50 starts driving of the photosensitive drum 1 and starts charging processing of the surface of the photosensitive drum 1 by the charging roller 2 (S101). At this time, in this embodiment, the control unit 50 applies a charging voltage under substantially the same condition as the condition at the image forming time to the charging roller 2. The control unit 50 forms substantially the same potential of the unexposed portion as the potential at the image forming time on the surface of the photosensitive drum 1.

Subsequently, the control unit 50 calculates, based on temperature and humidity of an atmospheric environment detected by the environment sensor 31, a moisture content and determines the voltage Vi (i=1 to 3) according to the calculated moisture content (S102). In this embodiment, the control unit 50 determines the voltage Vi according to preset information indicating a relation between the moisture content and the voltage Vi illustrated in Table 1. Linear interpolation is performed among moisture contents illustrated in Table 1. The information of Table 1 is stored in the memory 52.

TABLE 1

| | Moisture content | | |
|---|---|---|---|
| | 21.2 [g/m$^3$] | 8.9 [g/m$^3$] | 1.1 [g/m$^3$] |
| V1 | 250 [V] | 750 [V] | 1000 [V] |
| V2 | 500 [V] | 1000 [V] | 1250 [V] |
| V3 | 750 [V] | 1250 [V] | 1500 [V] |

Subsequently, the control unit 50 performs measurement of the currents IDi and ILi using the voltage Vi determined in S102 (S103). At this time, in this embodiment, the potential of the exposed portion on the photosensitive drum 1 is formed in the rotation axis direction of the photosensitive drum 1 over substantially an entire region that can be exposed by the exposure device 3. This is to achieve improvement of detection accuracy by increasing a difference between the current IDi and the current ILi as much as possible. At this time, the potential of the unexposed portion on the photosensitive drum 1 is formed in the rotation axis direction of the photosensitive drum 1 over substantially an entire region that can be charged by the charging roller 2.

Figure 4:
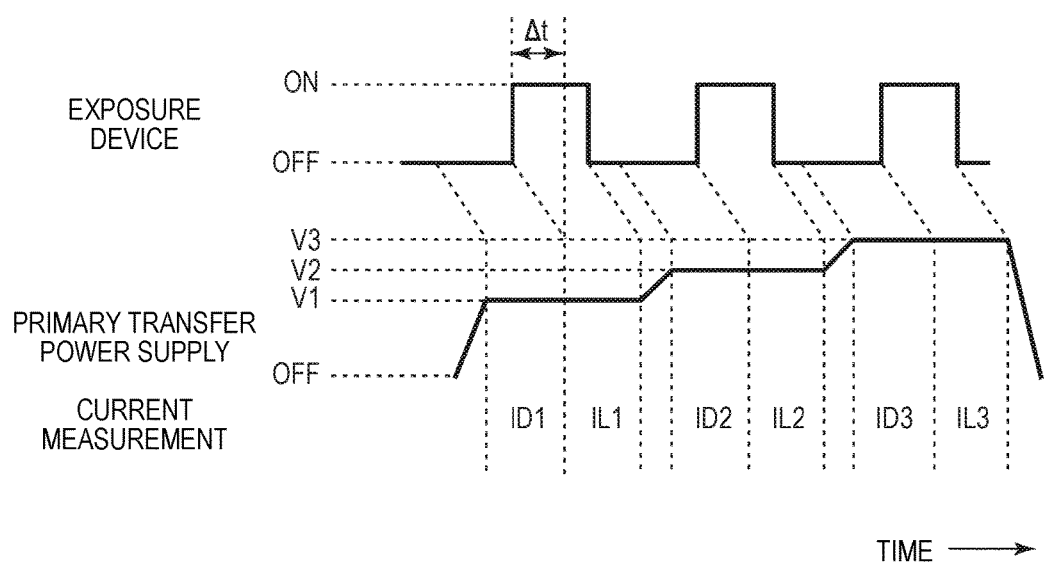
FIG. 4 is a timing chart of latent-image-contrast detection control.

FIG. 4 is a timing chart illustrating timings of the application of the voltage Vi, the exposure, and the measurement of the current IDi and the current ILi in this embodiment. In this embodiment, after the potential of the unexposed portion is formed on the photosensitive drum 1, the exposure device 3 is lit to form the potential of the exposed portion on the photosensitive drum 1. A voltage V1 is sequentially applied to the unexposed portion and the exposed portion on the photosensitive drum 1 and a current ID1 and a current IL1 are measured. Thereafter, the same measurement is performed concerning voltages V2 and V3. At this time, a time difference Δt is provided between a lighting start of the exposure device 3 and a measurement start of the current ILi. The time difference Δt is equivalent to a time required for the surface of the photosensitive drum 1 to move from an irradiation position of a laser by the exposure device 3 to the primary transfer section N1 in a rotating direction of the photosensitive drum 1. That is, the current IDi and the current ILi are respectively measured while the unexposed portion and the exposed portion on the photosensitive drum 1 are respectively passing the primary transfer section N1 to which the voltage Vi is applied. The current IDi and the current ILi may be respectively averages of measurement values for a predetermined period.

Figure 5:
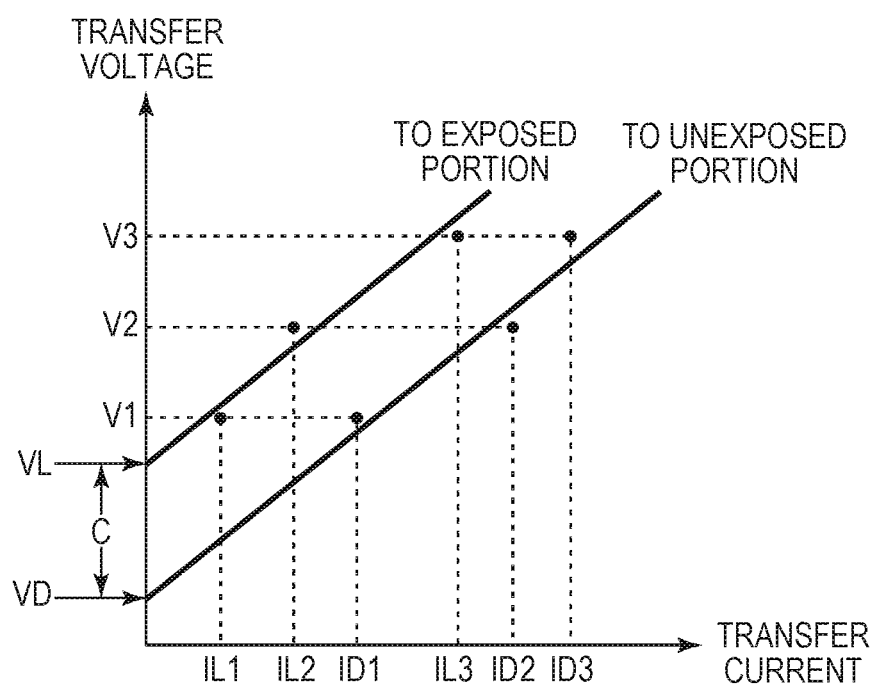
FIG. 5 is a graph for describing a latent-image-contrast detecting method.

Subsequently, the control unit 50 calculates, based on the currents Di and ILi measured in S103 and the voltage value Vi applied in the measurement, latent image contrast (S104). FIG. 5 is a graph illustrating a relation between the voltage Vi and the current IDi and a relation between the voltage Vi and the current ILi. In this embodiment, the control unit 50 calculates, from the voltage Vi and the current IDi and the current ILi, approximate curves respectively indicating the relation between the voltage Vi and the current IDi and the relation between the voltage Vi and the current ILi. The control unit 50 calculates latent image contrast from intercepts of the approximate curves.

Specifically, in this embodiment, the control unit 50 respectively calculates, from the voltage Vi and the current IDi and the current ILi, a gradient SD of a current-voltage characteristic with respect to the unexposed portion and a gradient SL of a current-voltage characteristic with respect to the exposed portion according to Expression 1 and Expression 2 described below.

$$SD=\{(V3-V1)/(ID3-ID1)+(V3-V2)/(ID3-ID2)+(V2-V1)/(ID2-ID1)\}/3 \quad \text{Expression 1}$$

$$SL=\{(V3-V1)/(IL3-IL1)+(V3-V2)/(IL3-IL2)+(V2-V1)/(IL2-IL1)\}/3 \quad \text{Expression 2}$$

The control unit 50 respectively calculates an intercept VD of the current-voltage characteristic with respect to the unexposed portion and an intercept VL of the current-voltage characteristic with respect to the exposed portion according to Expression 3 and Expression 4 described below from the gradients SD and SL calculated by Expression 1 and Expression 2 described above. That is, in this embodiment, the control unit 50 sets, as approximate straight lines, a straight line having the gradient SD calculated by Expression 1 and Expression 2 described above and passing the average of the voltage Vi and the average of the current IDi and a straight line having the gradient SL and passing the average of the voltage Vi and the average of the current ILi and respectively calculates the intercepts VD and VL.

$$VD=(V1+V2+V3)/3-SD\times(ID1+ID2+ID3)/3 \quad \text{Expression 3}$$

$$VL=(V1+V2+V3)/3-SL\times(IL1+IL2+IL3)/3 \quad \text{Expression 4}$$

In this embodiment, the approximate curves are calculated by the method described above. However, the approximate curves may be calculated using any other method such as the method of least squares.

The control unit 50 calculates latent image contrast C according to Expression 5 described below. That is, in this embodiment, the control unit 50 calculates a difference between the intercept VD and the intercept VL and sets a value of the difference as the latent image contrast C.

$$C=VL-VD \quad \text{Expression 5}$$

4-2. Light Amount Control for the Exposure Device

Light amount control for the exposure device 3 in the adjusting operation is described. The light amount control for the exposure device 3 corresponds to processing in S105 in the procedure illustrated in FIG. 3.

In this embodiment, in the processing in S103, the control unit 50 changes a light amount of the exposure device 3 (an output of a laser) in forming the potential of the exposed portion on the photosensitive drum 1 to five stages of E1 to E5. The control unit 50 measures the current ILi with respect to light amounts. The measurement of a current with respect to the light amounts can be performed on exposed portions sequentially formed by respectively extending measurement periods of the currents ILi illustrated in FIG. 4. Alternatively, entire measuring operation illustrated in FIG. 4 may be repeated by the number of light amount settings. In processing in S104, the control unit 50 calculates latent image contrasts C1 to C5 corresponding to the light amounts. The light amount of the exposure device 3 is represented by an exposure amount ($\mu J/cm^2$) per unit time in a unit area on the photosensitive drum 1. However, it is assumed here that the light amount of the exposure device 3 is indicated by a ratio to a predetermined light amount set to 100%. As an example, it is assumed that a light amount currently in use is 60%. At this time, in this embodiment, the light amounts in the five stages are set to E1: 60%, E2: 80%, E3: 100%, E4: 120% and E5: 140% of the light amount currently in use.

Figure 6:
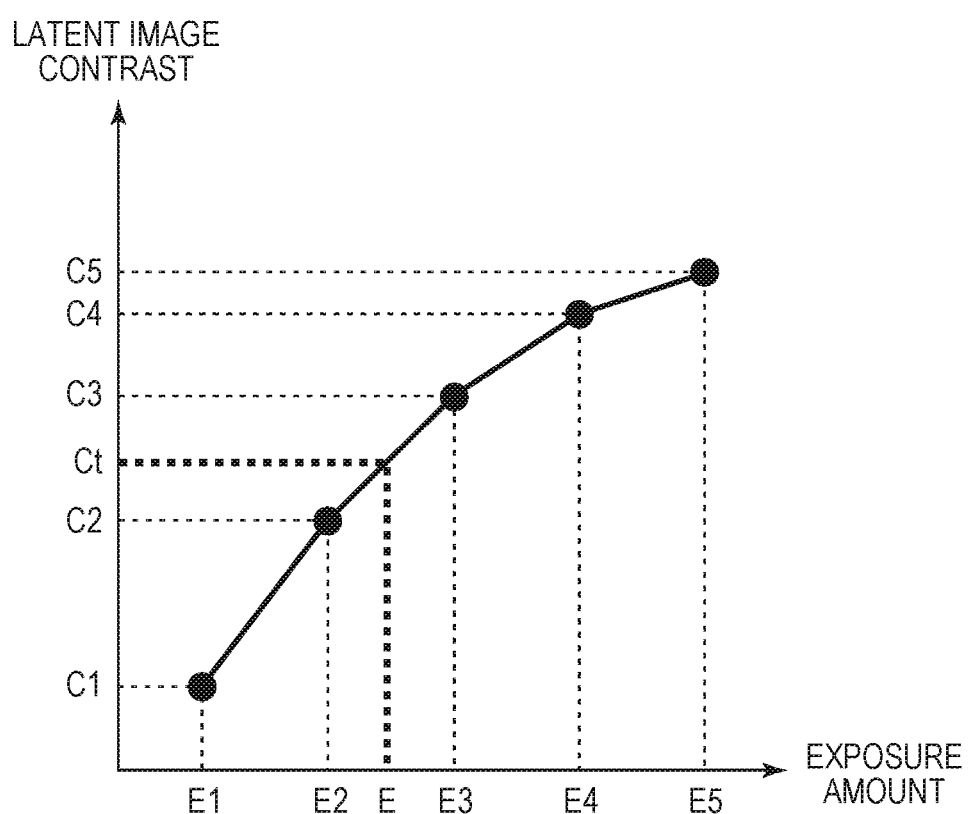
FIG. 6 is a graph for describing an exposure-amount determining method.

The control unit 50 calculates, based on the calculated latent image contrasts C1 to C5 and the light amounts E1 to E5 used in calculating the latent image contrasts C1 to C5, a light amount E with which the target latent image contrast Ct is obtained (S105). FIG. 6 is a graph illustrating a relation between the light amounts E1 to E5 of the exposure device 3 and the latent image contrasts C1 to C5. In this embodiment, the control unit 50 performs linear interpolation using two points across the target latent image contrast Ct among the latent image contrasts C1 to C5 to calculate the light amount E of the exposure device 3 with which the target latent image contrast Ct is obtained. In the case of an example illustrated in FIG. 6, the control unit 50 calculates the light amount E of the exposure device 3 according to Expression 6 described below using C2, C3, E2 and E3.

$$E=E2+(E3-E2)\times(Ct-C2)\div(C3-C2) \quad \text{Expression 6}$$

The control unit 50 causes the memory 52 to store setting of the calculated light amount of the exposure device 3 as setting of a light amount of the exposure device 3 at the image forming time until the next adjustment and ends the adjusting operation.

5. Execution Timing

Execution timing of the adjusting operation is described. Examples of a factor of fluctuation of latent image contrast include a decrease in the film thickness of the photosensitive layer due to use of the photosensitive drum 1 and a change in an atmospheric environment.

Therefore, in this embodiment, the adjusting operation is executed during a start of use of the process cartridge 7. Thereafter, the adjusting operation is performed at predetermined timing. Consequently, the light amount of the exposure device 3 is adjusted such that latent image contrast is maintained substantially constant at the target latent image contrast Ct. Specifically, in this embodiment, when either a use amount of the photosensitive drum 1 or a change in a moisture content in an atmospheric environment since the last adjusting operation satisfies a condition decided in advance, the adjusting operation is executed again. In this embodiment, the predetermined condition of the use amount of the photosensitive drum 1 is that the photosensitive drum 1 is used for printing of 1000 sheets set as a threshold or more. The predetermined condition of the moisture content in the atmospheric environment is that the moisture content changes 2.5 [$g/m^3$] set as a threshold or more.

The control unit 50 can determine, based on the information stored in the cartridge memory 84, whether the process cartridge 7 is a new product. The control unit 50 successively integrates the number of sheets printed using the photosensitive drum 1 as information correlated to the use amount of the photosensitive drum 1 and causes the cartridge memory 84 functioning as a counting unit (a counter) to store the number of prints. The control unit 50 can calculate, based on the temperature and the humidity of the atmospheric environment detected by the environment sensor 31, a moisture content. In this embodiment, every time one sheet is printed (or for each job), the control unit 50 compares a present use amount of the photosensitive drum 1 and a present moisture content in the atmospheric environment respectively with the thresholds. When either the present use amount of the photosensitive drum 1 or the present moisture content in the atmospheric environment satisfies the predetermined condition, the control unit 50 causes the image forming apparatus 100 to execute the adjusting operation during the pre-rotation process, the head gap process, or the post-rotation process at the non-image forming time.

6. Effects

In this embodiment, the image forming apparatus 100 includes the charging roller 2 functioning as a charging unit for charging a photosensitive member and forming an unexposed portion on the photosensitive member. The image forming apparatus 100 includes the exposure device 3 functioning as an exposure unit for exposing the photosensitive member charged by the charging unit and forming an exposed portion on the photosensitive member. The image forming apparatus 100 includes the primary transfer roller 5 functioning as a voltage applying member that applies a voltage to the photosensitive member and the primary transfer power supply 23 functioning as a power supply that supplies a voltage or a current to the voltage applying member. The image forming apparatus 100 includes the current detection circuit 71 functioning as a detecting unit that detects a value of a current flowing to the photosensitive member when the voltage is supplied to the voltage applying member by the power supply or a value of a voltage applied to the photosensitive member when the current is supplied to the voltage applying member by the power supply. The image forming apparatus 100 includes the control unit 50 functioning as a controlling unit for performing control described below. A not-illustrated acquiring unit acquires, based on detection results of the current detection circuit 71 obtained when voltages are respectively applied to the unexposed portion and the exposed portion on the photosensitive drum 1 by the primary transfer roller 5, information concerning a difference between the potential of the unexposed portion and the potential of the exposed portion. At this time, the unexposed portion is formed in a direction substantially orthogonal to the moving direction of the surface of the photosensitive drum 1 over substantially an entire region that can be charged by the charging roller 2. The exposed portion is formed in the direction substantially orthogonal to the moving direction of the surface of the photosensitive drum 1 over an entire region that can be exposed by the exposure device 3. The control unit 50 controls, based on the information concerning the difference, the image forming condition.

The voltage applied to the photosensitive drum 1 by the primary transfer roller 5 when the information concerning the difference is acquired is only a voltage having the same polarity as the polarity of the voltage applied to the photosensitive drum 1 by the primary transfer roller 5 at the image forming time. In this embodiment, the acquiring unit calculates, based on the following respective relations, a difference between voltages at the time when predetermined currents respectively flow to the unexposed portion and the exposed portion and acquires, based on the difference between the voltages, the information concerning the difference. A first relation is a relation between a current value and a voltage value acquired based on a detection result of the current detection circuit 71 by applying a plurality of different voltages to the unexposed portion. A second relation is a relation between a current value and a voltage value acquired based on a detection result of the current detection circuit 71 by applying a plurality of different voltages to the exposed portion. In this embodiment, the control unit 50 performs the control such that the difference approaches a target value. In particular, in this embodiment, the control unit 50 controls the light amount of the exposure device 3 as the image forming condition.

In this way, in this embodiment, the voltage having the same polarity as the polarity at the image forming time is supplied to the primary transfer roller 5 and the voltages are applied to the unexposed portion and the exposed portion on the photosensitive drum 1 to calculate latent image contrast. That is, in this embodiment, discharge start voltages on the positive polarity side and the negative polarity side are not calculated to calculate the absolute value of the potential of the exposed portion. In this embodiment, a difference between the voltages at the time when the predetermined currents are respectively fed to the unexposed portion and the exposed portion is calculated and latent image contrast, which is a potential difference between the unexposed portion and the exposed portion, is calculated. Therefore, according to this embodiment, the power supply that outputs a voltage having a polarity different from a polarity at the image forming time is unnecessary. A power supply configuration can be simplified. A time for switching the polarity of a voltage can be made unnecessary to reduce a down time (a time in which image output cannot be performed). That is, according to this embodiment, it is possible to acquire information concerning latent image contrast in a relatively short time with a simple configuration. In this embodiment, based on the acquired information concerning the latent image contrast, the light amount of the exposure device 3 is controlled as the image forming condition. Consequently, it is possible to appropriately control the latent image contrast. It is possible to stabilize image density and tone reproduction.

7. Modifications

Several modifications of this embodiment are described.

In this embodiment, the voltage supplied from the primary transfer power supply 23 to the primary transfer roller 5 is constant-voltage-controlled. However, the voltage may be constant-current-controlled. In this case, voltages generated when the predetermined currents are fed to the unexposed portion and the exposed portion on the photosensitive drum by the primary transfer roller 5 are measured. As in this embodiment, a relation between a current value and a voltage value is calculated. Latent image contrast can be calculated based on a difference between the current value and the voltage value.

In this embodiment, the target latent image contrast Ct is set in advance for each image forming unit P (or process cartridge 7). However, the target latent image contrast Ct may be a common value set concerning the image forming apparatus 100. Latent image contrast calculated in the same manner as in this embodiment during the use start of the process cartridge 7 may be set as target latent image contrast. Thereafter, in the adjusting operation, the light amount of the exposure device 3 may be controlled such that the target latent image contrast (initial latent image contrast) can be obtained. That is, the light amount of the exposure device 3 may be controlled such that the latent image contrast is substantially the same as the initial latent image contrast.

In this embodiment, the light amount of the exposure device 3 is changed to a plurality of light amounts, latent image contrasts are calculated for the light amounts, and the light amount of the exposure device 3 is controlled. On the other hand, the latent image contrast may be calculated with only one light amount such as a light amount currently in use. The light amount of the exposure device 3 may be controlled based on a comparison result of the calculated latent image contrast and the target latent image contrast (or the initial latent image contrast).

In this embodiment, the number of sheets printed using the photosensitive drum 1 is used as the information correlated to the use amount of the photosensitive drum 1. However, as the information, for example, a driving time (a rotation time), the number of times of rotation, or a traveling distance of the photosensitive drum 1 may be used. In this embodiment, the moisture content in the atmospheric environment is used as the environment information. However, as the environment information, for example, a state of the temperature of the photosensitive drum 1 may be predicted from a driving time and a stop time of the photosensitive drum 1.

In this embodiment, the primary transfer roller 5 is used as the voltage applying member that applies the voltage to the photosensitive drum 1. However, the present invention is not limited to this. A member that is disposed in contact with or continuous with the photosensitive drum 1 and can apply a voltage to the surface of the photosensitive drum 1 to feed a current can be used as the voltage applying member. For example, the charging roller 2 may be used as the voltage applying member and a current detecting unit for detecting a current at the time when a voltage is applied to the photosensitive drum 1 by the charging roller 2 and a voltage detecting unit for detecting a voltage at that time may be provided to perform the same measurement as the measurement in this embodiment. In this case, a voltage supplied to the charging roller 2 when a current (or a voltage) is measured is set to the same polarity as the polarity of the surface potential of the photosensitive drum 1 and an absolute value larger than the surface potential of the photosensitive drum 1. Consequently, as in this embodiment, it is possible to measure latent image contrast without preparing a power supply that outputs a voltage having a polarity different from a polarity at the image forming time. In this case, the surface potential of the photosensitive drum 1 changes after the measurement of the current (or the voltage). Therefore, a measuring operation for a current (or a voltage) and a forming operation for a predetermined surface potential (a potential of the unexposed portion and a potential of the exposed portion) may be alternately performed at every turn of the photosensitive drum 1.

Second Embodiment

Another embodiment of the present invention is described. A basic configuration and a basic operation of an image forming apparatus in this embodiment is the same as the basic configuration and the basic operation of the image forming apparatus in the first embodiment. Therefore, in the image forming apparatus in this embodiment, the same reference numerals and signs as the reference numerals and sings in the first embodiment are attached to elements having functions or configurations same as or corresponding to the functions or the configurations of the image forming apparatus in the first embodiment. Detailed description of the elements is omitted.

1. Configuration of the Image Forming Apparatus

Figure 7:
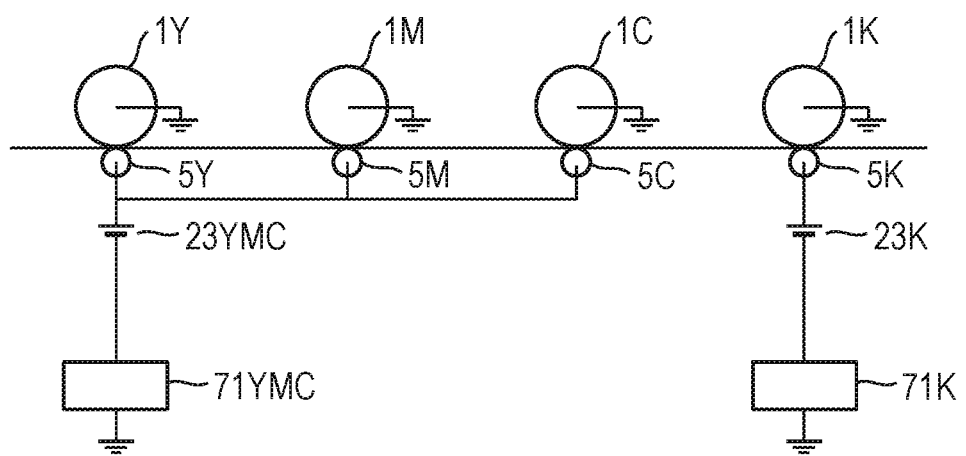
FIG. 7 is a schematic diagram illustrating another example of a voltage application configuration.

FIG. 7 is a schematic diagram illustrating a primary transfer voltage application configuration in the image forming apparatus 100 in this embodiment. In this embodiment, as illustrated in FIG. 7, a voltage is supplied to the primary transfer rollers 5Y, 5M and 5C of the first image forming unit PY, the second image forming unit PM, and the third image forming unit PC from a common primary transfer power supply (referred to as "first primary transfer power supply" as well) 23YMC. A voltage is supplied to the primary transfer roller 5K of the fourth image forming unit PK from an independent primary transfer power supply (referred to as "second primary transfer power supply" as well) 23K. In this embodiment, a reduction in the cost and a reduction in the size of the apparatus are achieved by such a configuration.

In this embodiment, in the image forming apparatus 100, a first current detection circuit 71YMC that detects a value of a current flowing to the first primary transfer power supply 23YMC (a sum of currents flowing to the photosensitive drums 1Y, 1M and 1C) is provided. In the image forming apparatus 100, a second current detection circuit 71K that detects a value of a current flowing to the second primary transfer power supply 23K (a current flowing to the photosensitive drum 1K) is provided. The control unit 50 can detect, from setting values of output voltages of the first primary transfer power supply 23YMC and the second primary transfer power supply 23K retained by the high-voltage control unit 20, values of voltages supplied from the power supplies 23YMC and 23K to the primary transfer rollers 5Y, 5M, 5C and 5K.

In this embodiment, latent-image-contrast detection control in the adjusting operation is changed from the latent-image-contrast detection control in the first embodiment to be adapted to a configuration in which the primary transfer power supply 23 is used in common for the plurality of image forming units P.

2. Procedure of an Adjusting Operation for an Image Forming Condition

A procedure of an adjusting operation for an image forming condition in this embodiment is described. In this embodiment, an adjusting operation in the fourth image forming unit PK is the same as the operation described in the first embodiment. Therefore, the procedure is described focusing on an adjusting operation in the first image forming unit PY, the second image forming unit PM, and the third image forming unit PC. The adjusting operation in the fourth image forming unit PK may be performed in parallel to or may be performed separately from the adjusting operation in the first image forming unit PY, the second image forming unit PM, and the third image forming unit PC described below. The adjusting operation in the first image forming unit PY, the second image forming unit PM, and the third image forming unit PC as a whole is performed in the same procedure as the procedure in the first embodiment illustrated in FIG. 3.

2-1. Latent-Image-Contrast Detection Control

First, the latent-image-contrast detection control in the adjusting operation is described. The latent-image-contrast detection control corresponds to the processing in S101 to S104 in the procedure illustrated in FIG. 3.

Variable names used in this control are defined as follows.

$V_i$ (i=1 to 3): A voltage applied to the photosensitive drums 1Y, 1M and 1C by the primary transfer rollers 5Y, 5M and 5C in this control. The voltage is constant-voltage-controlled. In Vi, i is a number designating voltages. In this embodiment, the voltage $V_i$ is set to be a voltage equal to or higher than a discharge start voltage at which electric discharge to the photosensitive drums 1Y, 1M and 1C is generated.

$JD_i$ (i=1 to 3): A current flowing to the primary transfer power supply 23YMC (a sum of currents flowing to the photosensitive drums 1Y, 1M and 1C) when the voltage Vi is applied to the unexposed portions on the photosensitive drums 1Y, 1M and 1C.

$JL_i$ (i=1 to 3): A current flowing to the primary transfer power supply 23YMC (a sum of currents flowing to the photosensitive drums 1Y, 1M and 1C) when the voltage Vi is applied to the exposed portions on the photosensitive drums 1Y, 1M and 1C.

$JLY_i$ (i=1 to 3): A current flowing to the primary transfer power supply 23YMC (a sum of currents flowing to the photosensitive drums 1Y, 1M and 1C) when the voltage Vi is applied to the exposed portion on the photosensitive drum 1Y and the unexposed portions on the photosensitive drums 1M and 1C.

JLYMi (i=1 to 3): A current flowing to the primary transfer power supply 23YMC (a sum of currents flowing to the photosensitive drums 1Y, 1M and 1C) when the voltage Vi is applied to the exposed portions on the photosensitive drums 1Y and 1M and the unexposed portion on the photosensitive drum 1C.

First, when execution timing of the adjusting operation comes, the control unit 50 starts driving of the photosensitive drums 1Y, 1M and 1C and starts charging processing for the surfaces of the photosensitive drums 1Y, 1M and 1C by the charging rollers 2Y, 2M and 2C (S101). At this time, in this embodiment, the control unit 50 applies a charging voltage under substantially the same condition as the condition at the image forming time to the charging rollers 2Y, 2M and 2C. The control unit 50 forms substantially the same potential of the unexposed portion as the potential at the image forming time on the surfaces of the photosensitive drums 1Y, 1M and 1C.

Subsequently, the control unit 50 calculates, based on temperature and humidity of an atmospheric environment detected by the environment sensor 31, a moisture content and determines the voltage Vi (i=1 to 3) according to the calculated moisture content (S102). In this embodiment, the control unit 50 determines the voltage Vi according to Table 1. Linear interpolation is performed among moisture contents illustrated in Table 1.

Subsequently, the control unit 50 performs measurement of the currents JDi, JLi, JLYi and JLYMi using the voltage Vi determined in S102 (S103). At this time, in this embodiment, the potentials of the exposed portions on the photosensitive drums 1Y, 1M and 1C are formed in the rotation axis direction of the photosensitive drums 1Y, 1M and 1C over substantially an entire region that can be exposed by the exposure device 3. This is to achieve improvement of detection accuracy by increasing a difference between the current JDi and the currents JLi, JLYi and JLYMi as much as possible. At this time, the potentials of the unexposed portions on the photosensitive drums 1Y, 1M and 1C are formed in the rotation axis direction of the photosensitive drums 1Y, 1M and 1C over substantially an entire region that can be charged by the charging rollers 2Y, 2M and 2C.

Figure 8:
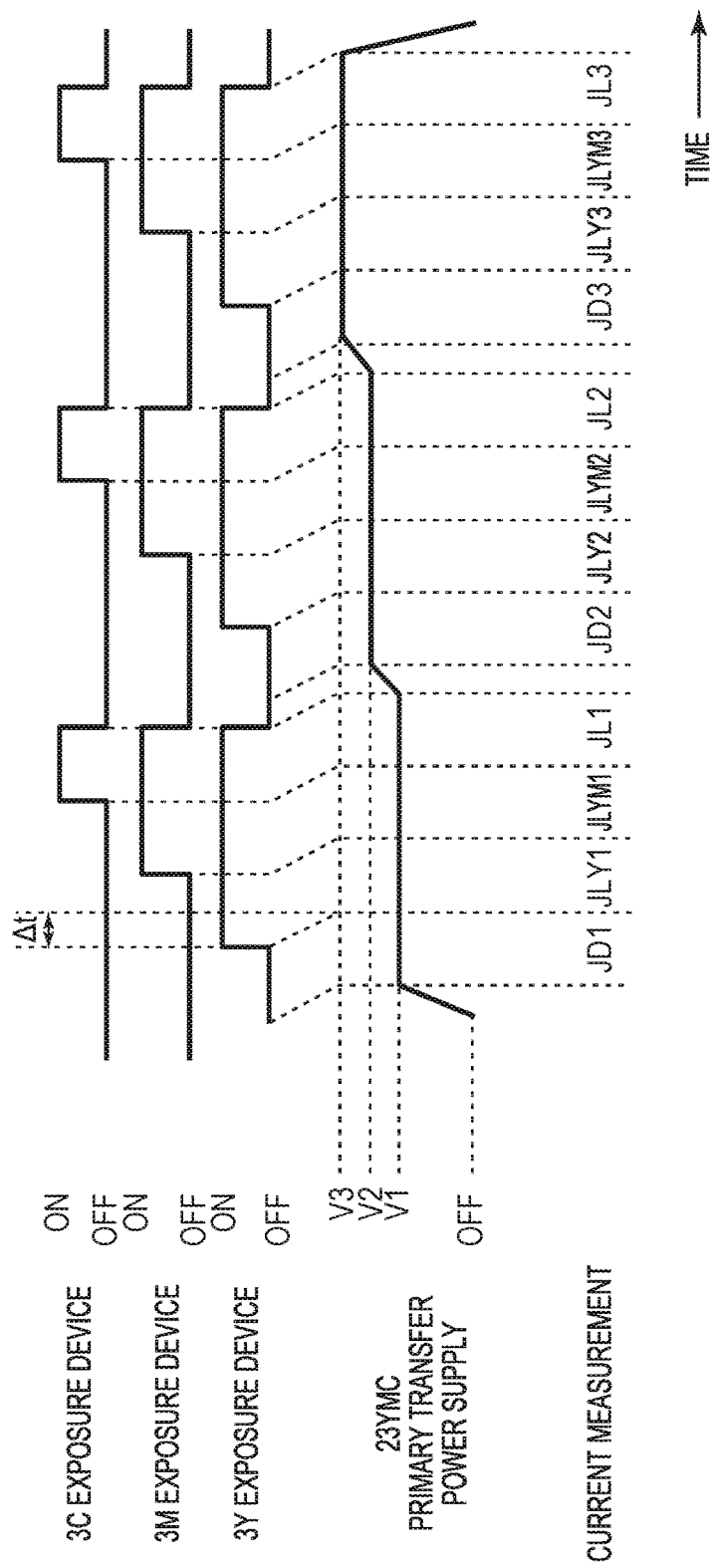
FIG. 8 is a timing chart of another example of the latent-image-contrast detection control.

FIG. 8 is a timing chart illustrating timings of the application of the voltage Vi, the exposure, and the measurement of the currents JDi, JLi, JLYi and JLYMi in this embodiment. In this embodiment, after the potentials of the unexposed portions are formed on the photosensitive drums 1Y, 1M and 1C, the exposure device 3Y is lit to form the potential of the exposed portion on the photosensitive drum 1Y. The voltage V1 is sequentially applied to the unexposed portions and the exposed portions on the photosensitive drums 1Y, 1M and 1C and currents JD1 and JLY1 are measured.

Subsequently, while the exposure device 3Y is kept lit, the exposure device 3M is lit to form the potential of the exposed portion on the photosensitive drum 1M and a current JLYM1 is measured. Subsequently, while the exposure devices 3Y and 3M are kept lit, the exposure device 3C is lit to form the potential of the exposed portion on the photosensitive drum 1C and a current JL1 is measured. Thereafter, the same measurement is performed concerning voltages V2 and V3. At this time, a time difference Δt is provided between a lighting start of the exposure devices 3 and a measurement start of the currents JLYi, JLYMi and JLi. The time difference Δt is equivalent to a time required for the surfaces of the photosensitive drums 1 to move from an irradiation position of a laser by the exposure devices 3 to the primary transfer sections N1 in a rotating direction of the photosensitive drum 1. The currents JDi, JLi, JLYi and JLYMi may be respectively averages of measurement values for a predetermined period.

Subsequently, the control unit 50 calculates, based on the currents JDi, JLi, JLYi and JLYMi measured in S103 and the voltage Vi applied in the measurement, latent image contrast (S104).

Figure 9:
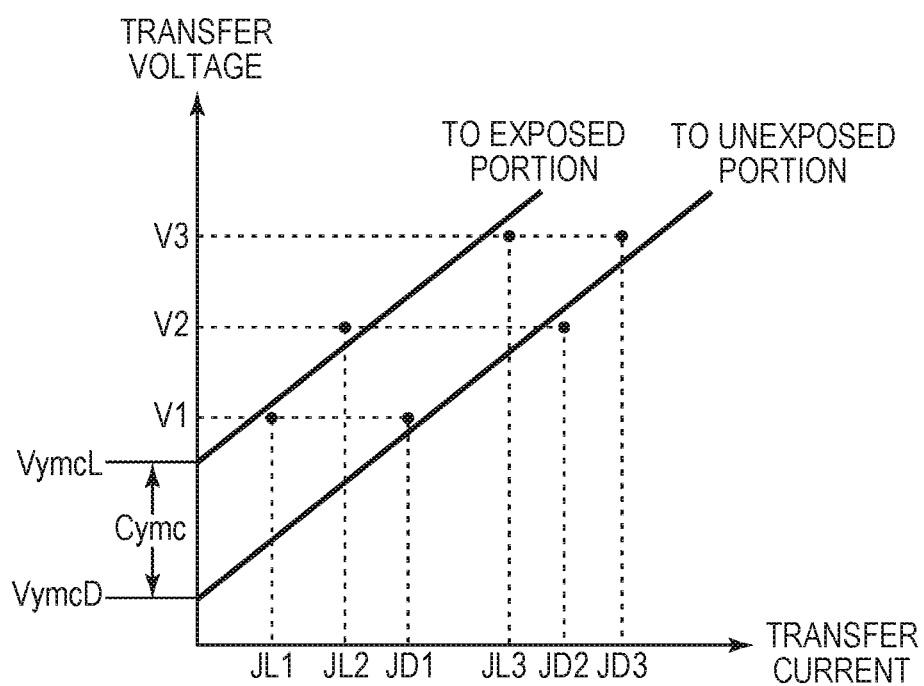
FIG. 9 is a graph for describing another example of the latent-image-contrast detecting method.

First, the control unit 50 calculates an average latent image contrast Cymc, which is an average of latent image contrasts in the photosensitive drums 1Y, 1M and 1C. FIG. 9 is a graph illustrating a relation between the voltage Vi and the current JDi and a relation between the voltage Vi and the current JLi. In this embodiment, as in the case of the first embodiment, the control unit 50 respectively calculates, from the voltage Vi and the currents JDi and JLi, according to Expression 7 and Expression 8 described below, a gradient SymcD of a current-voltage characteristic with respect to the unexposed portion and a gradient SymcL of a current-voltage characteristic with respect to the exposed portion. The currents JDi and JLi are sums of currents flowing to the photosensitive drums 1Y, 1M and 1C. Therefore, the gradients SymcD and SymcL calculated by Expression 7 and Expression 8 described below are average gradients of current-voltage characteristics of the photosensitive drums 1Y, 1M and 1C.

$$\text{SymcD} = \{(V3-V1)/(JD3-JD1) + (V3-V2)/(JD3-JD2) + (V2-V1)/(JD2-JD1)\}/3 \quad \text{Expression 7}$$

$$\text{SymcL} = \{(V3-V1)/(JL3-JL1) + (V3-V2)/(JL3-JL2) + (V2-V1)/(JL2-JL1)\}/3 \quad \text{Expression 8}$$

As in the case of the first embodiment, the control unit 50 respectively calculates, from the gradients SymcD and SymcL calculated by Expression 7 and Expression 8 described above, according to Expression 9 and Expression 10 described below, an intercept VymcD of the current-voltage characteristic with respect to the unexposed portion and an intercept VymcL of the current-voltage characteristic with respect to the exposed portion. The intercepts VymcD and VymcL calculated by Expression 9 and Expression 10 described below are average intercepts of the current-voltage characteristics of the photosensitive drums 1Y, 1M and 1C.

$$VymcD = (V1+V2+V3)/3 - \text{SymcD} \times (JD1+JD2+JD3)/3 \quad \text{Expression 9}$$

$$VymcL = (V1+V2+V3)/3 - \text{SymcL} \times (JL1+JL2+JL3)/3 \quad \text{Expression 10}$$

In this embodiment, the approximate curves are calculated by the method described above. However, the approximate curves may be calculated using any other method such as the method of least squares.

The control unit 50 calculates latent image contrast Cymc according to Expression 11 described below. That is, in this embodiment, the control unit 50 calculates a difference between the intercept VymcD and the intercept VymcL and sets a value of the difference as the latent image contrast Cymc. The latent image contrast Cymc calculated by Expression 11 described below is average latent image contrast of the photosensitive drums 1Y, 1M and 1C.

$$Cymc = VymcL - VymcD \quad \text{Expression 11}$$

Subsequently, the control unit 50 calculates latent image contrasts Cy, Cm and Cc in the photosensitive drums 1Y, 1M and 1C. In this embodiment, the control unit 50 calculates, from the currents JDi, JLi, JLYi and JLYMi measured in S103, current variations Jy, Jm and Jc, which are differences between currents to the unexposed portions and currents to the exposed portions, in the respective photosensitive drums 1Y, 1M and 1C. Specifically, the control unit 50 calculates, according to Expression 12 described below, a current variation Jyi in the photosensitive drum 1Y in the respective cases of i=1 to 3 and sets an average of the current variation Jyi as a current variation Jy (=(Jy1+Jy2+Jy3)/3) in the photosensitive drum 1Y.

$$Jyi = JLYi - JDi \qquad \text{Expression 12}$$

Similarly, the control unit 50 calculates, according to Expression 13 described below, a current variation Jmi in the photosensitive drum 1M in the respective cases of i=1 to 3 and sets an average of the current variation Jmi as a current variation Jm (=(Jm1+JM2+Jm3)/3) in the photosensitive drum 1M.

$$Jmi = JLYMi - JLYi \qquad \text{Expression 13}$$

Similarly, the control unit 50 calculates, according to Expression 14 below, a current variation Jci in the photosensitive drum 1C in the respective cases of i=1 to 3 and sets an average of the current variation Jci as a current variation Jc (=(Jc1+Jc2+Jc3)/3) in the photosensitive drum 1C.

$$Jci = JLi - JLYMi \qquad \text{Expression 14}$$

The control unit 50 reads film thickness information Dy, Dm and Dc of the photosensitive layers of the photosensitive drums 1Y, 1M and 1C stored in cartridge memories 84Y, 84M and 84C and calculates an average D (=(Dy+Dm+Dc)/3) of the film thickness information.

The film thickness information Dy, Dm and Dc of the photosensitive layers of the photosensitive drums 1Y, 1M and 1C are calculated, for each process cartridge 7, based on information concerning use degrees of the photosensitive drums 1Y, 1M and 1C. The film thickness information Dy, Dm and Dc is stored in the cartridge memories 84Y, 84M and 84C respectively. That is, the film thickness of the photosensitive layer of the photosensitive drum 1 decreases according to use of the photosensitive drum 1. Therefore, the film thickness of the photosensitive layer of the photosensitive drum 1 can be predicted based on information correlated with the use amount of the photosensitive drum 1. In this embodiment, as in the first embodiment, the control unit 50 successively integrates the number of sheets printed using the photosensitive drums 1Y, 1M and 1C and causes the cartridge memories 84Y, 84M and 84C to store the number of printed sheets. In this embodiment, the control unit 50 successively causes the cartridge memories 84Y, 84M and 84C to store the film thickness information Dy, Dm and Dc calculated based on the number of printed sheets using a preset relational expression.

The control unit 50 corrects the calculated current variations Jy, Jm and Jc using the film thickness information Dy, Dm and Dc according to Expression 15 to Expression 17 described below. This is because, since electric capacities of the photosensitive drums 1Y, 1M and 1C change according to a change in the film thicknesses of the photosensitive layers, currents flowing to the photosensitive drums 1Y, 1M and 1C change in the case of the same potential difference. That is, Expression 15 to Expression 17 described below are expressions for respectively correcting the current variations Jy, Jm and Jc in the photosensitive drums 1Y, 1M and 1C to current variations at the time when the film thicknesses of the photosensitive layers of the photosensitive drums 1Y, 1M and 1C are the average D.

$$Jy' = Jy \times Dy/D \qquad \text{Expression 15}$$

$$Jm' = Jm \times Dm/D \qquad \text{Expression 16}$$

$$Jc' = Jc \times Dc/D \qquad \text{Expression 17}$$

The control unit 50 calculates, from current variations Jy', Jm' and Jc' after the correction calculated by Expression 15 to Expression 17 described above, according to Expression 18 to Expression 20, correction coefficients Fy, Fm and Fc for correcting the average latent image contrast Cymc.

$$Fy = 3 \times Jy' \div (Jy' + Jm' + Jc) \qquad \text{Expression 18}$$

$$Fm = 3 \times Jm' \div (Jy' + Jm' + Jc) \qquad \text{Expression 19}$$

$$Fc = 3 \times Jc' \div (Jy' + Jm' + Jc) \qquad \text{Expression 20}$$

The control unit 50 calculates, according to Expression 21 to Expression 23 described below, from the calculated average latent image contrast average Cymc and the correction coefficients Fy, Fm and Fc, the latent image contrasts Cy, Cm and Cc in the photosensitive drums 1Y, 1M and 1C.

$$Cy = Fy \times Cymc \qquad \text{Expression 21}$$

$$Cm = Fm \times Cymc \qquad \text{Expression 22}$$

$$Cc = Fc \times Cymc \qquad \text{Expression 23}$$

2-2. Light Amount Control for the Exposure Devices

Light amount control for the exposure devices 3Y, 3M and 3C in the adjusting operation is described. The light amount control for the exposure devices 3Y, 3M and 3C corresponds to the processing in S105 in the procedure illustrated in FIG. 3.

In this embodiment, in the processing in S103, the control unit 50 respectively changes light amounts of the exposure devices 3Y, 3M and 3C in forming the potentials of the exposed portions to the five stages of E1 to E5 and measures the currents JLYi, JLYMi and JLi with respect to the light amounts. The measurement of the currents with respect to the light amounts can be performed on the exposed portions sequentially formed by respectively extending measurement periods of the currents JLYi, JLYMi and JLi illustrated in FIG. 8. Alternatively, the entire measuring operation illustrated in FIG. 8 may be repeated by the number of light amount settings. In the processing in S104, the control unit 50 calculates latent image contrasts Cy1 to Cy5, Cm1 to Cm5 and Cc1 to Cc5 corresponding to the light amounts. As in the first embodiment, the control unit 50 respectively adjusts the setting of the light amounts of the exposure devices 3Y, 3M and 3C such that target latent image contrasts can be obtained.

3. Effects

In this way, in this embodiment, the image forming apparatus 100 includes the primary transfer power supply 23 and the current detection circuit 71 common to the plurality of photosensitive drums 1. The control unit 50 acquires information concerning a difference between the potential of the unexposed portion and the potential of the exposed portion in each of the plurality of photosensitive drums 1 and controls an image forming condition concerning each of the plurality of photosensitive drums 1. In particular, in this embodiment, when the number of a plurality of photosensitive members is represented as n, the acquiring unit acquires, based on the following respective kinds of information, information concerning a difference in each of the plurality of photosensitive members. The number n is an integer equal to or larger than 2. First, the information is a detection result of the current detection circuit 71 at the time when voltages are simultaneously applied to the unexposed portions on the n photosensitive drums 1. The information is a detection result of the current detection circuit 71 at the time when voltages are simultaneously applied to the exposed portions or the unexposed portions on the plurality of photosensitive drums 1 when the number of photosensitive drums 1 forming the exposed portions is varied one by one from 1 to n. The information is information concerning a degree of use of each of the plurality of photosensitive members.

As described above, according to this embodiment, even in the configuration in which the primary transfer power supply 23 is used in common for the plurality of image forming units P, it is possible to acquire information concerning latent image contrast for each image forming unit P with a simple configuration and in a relatively short time and appropriately control the latent image contrast.

Concerning this embodiment, it is possible to perform, for example, the same changes as the modifications described concerning the first embodiment.

In this embodiment, the primary transfer power supply 23 and the current detection circuit 71 are used in common for the three image forming units P. However, not only this, but the number of image forming units P for which the primary transfer power supply 23 and the current detection circuit 71 are used in common may be two or may be four or more.

The detection method for latent image contrasts of the photosensitive drums 1Y, 1M and 1C in this embodiment is desirable in terms of simplification of control and a reduction of a control time. However, not only this, but the primary transfer rollers 5Y, 5M and 5C may be separated from the photosensitive drums 1Y, 1M and 1C as appropriate and latent image contrasts of the photosensitive drums 1Y, 1M and 1C may be independently measured as in the first embodiment using the common primary transfer power supply 23YMC and the common current detection circuit 71YMC.

Third Embodiment

Another embodiment of the present invention is described. A basic configuration and a basic operation of an image forming apparatus in this embodiment are the same as the basic configuration and the basic operation in the first embodiment. Therefore, in the image forming apparatus in this embodiment, the same reference numerals and signs as the reference numerals and signs in the first embodiment are attached to elements having functions or configurations same as or corresponding to the functions or the configurations of the image forming apparatus in the first embodiment. Detailed description of the elements is omitted.

In this embodiment, detection and control of latent image contrast in the image forming apparatus 100 implemented with a wide color gamut mode in which an amount of toner adhering to the exposed portion on the photosensitive drum 1 is set larger than the amount of toner in a normal mode are described.

1. Wide Color Gamut Mode

Figure 10:
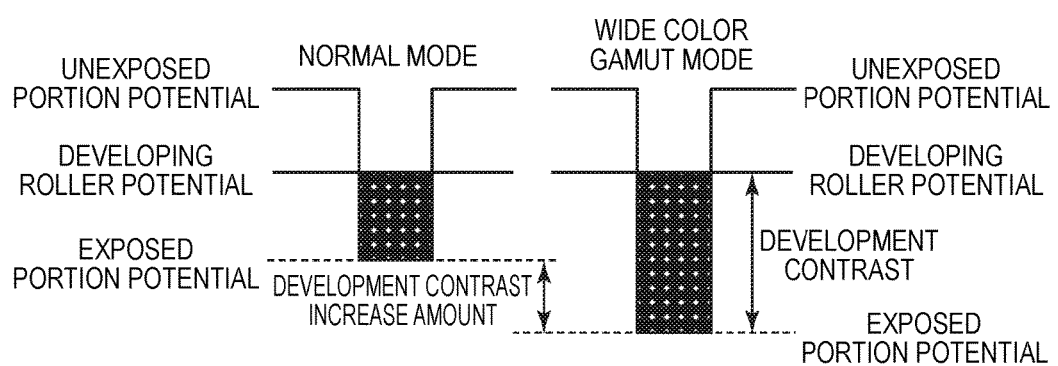
FIG. 10 is a schematic diagram for describing a wide color gamut mode.

First, the wide color gamut mode in this embodiment is described. FIG. 10 is a schematic diagram comparing and illustrating the surface potentials of the photosensitive drum 1 respectively in the normal mode and the wide color gamut mode.

In the wide color gamut mode, a light amount of the exposure device 3 is set larger than the light amount of the exposure device 3 in the normal mode to reduce the absolute value of the potential of the exposed portion on the photosensitive drum 1. Consequently, in the wide color gamut mode, "development contrast", which is a potential difference between the potential of the developing roller 41 and the potential of the exposed portion on the photosensitive drum 1, is set larger than the development contrast in the normal mode. Therefore, in the wide color gamut mode, an amount of toner adhering to the exposed portion (an image section) on the photosensitive drum 1 is larger than the amount of toner in the normal mode.

In this embodiment, in both of the normal mode and the wide color gamut mode, the image forming apparatus 100 is in a state in which toner remains on the developing roller 41 after the toner is supplied to the photosensitive drum 1. That is, as illustrated in FIG. 10, the development contrast is compensated by electric charges of the toner adhering to the exposed portion on the photosensitive drum 1. In the wide color gamut mode, a primary transfer voltage, a second transfer voltage and fixing temperature control are corrected according to an increase in an amount of the toner adhering the exposed portion on the photosensitive drum 1.

However, a variation of the potential of the exposed portion on the photosensitive drum 1 at the time when the light amount of the exposure device 3 is changed fluctuates according to characteristics of the photosensitive drum 1 such as the film thickness of the photosensitive layer or an atmospheric environment. Therefore, when the image forming apparatus 100 is switched from the normal mode to the wide color gamut mode, if the light amount of the exposure device 3 is uniformly changed with a value decided in advance, the potential of the exposed portion on the photosensitive drum 1 cannot be stabilized. As a result, it is likely that insufficiency of an effect of color gamut enlargement occurs because the amount of the toner adhering to the exposed portion increases less than expected and transfer failure or fixing failure occurs because the amount of the toner adhering to the exposed portion of the photosensitive member increases more than expected. Therefore, it is desired to control a change width of the light amount of the exposure device 3 according to the characteristics of the photosensitive drum 1 such as the film thickness of the photosensitive layer or the atmospheric environment.

In this embodiment, an increase amount of the toner in the wide color gamut mode is appropriately controlled using a result of detection of latent image contrast.

2. Adjusting Operation for an Image Forming Condition in the Wide Color Gamut Mode A procedure of an adjusting operation for an image forming condition in the wide color gamut mode is described. In this embodiment, because the procedure of the adjusting operation in the image forming units P is substantially the same, the procedure is described focusing on one image forming unit P. The adjusting operation is performed as a whole in the same procedure as the procedure of the adjusting operation (the adjusting operation for the image forming condition in the normal mode) described in the first embodiment illustrated in FIG. 3.

2-1. Latent-Image-Contrast Detection Control

Latent-image-contrast detection control in the adjusting operation for the image forming condition in the wide color gamut mode is the same as the latent-image-contrast detection control in the adjusting operation (the adjusting operation for the image forming condition in the normal mode) described in the first embodiment. However, a light amount of the exposure device 3 in forming the potential of the exposed portion on the photosensitive drum 1 is different.

2-2. Light Amount Control for the Exposure Device

Light amount control for the exposure device 3 in the adjusting operation for the image forming condition in the wide color gamut mode is described. The light amount control for the exposure device 3 corresponds to the processing in S105 in the procedure illustrated in FIG. 3.

In this embodiment, in the processing in S103 in FIG. 3, the control unit 50 changes a light amount of the exposure device 3 (an output of a laser) in forming the potential of the exposed portion on the photosensitive drum 1 to six stages of E0 to E5 and measures the current Li with respect to light amounts. In the processing in S104 in FIG. 3, the control unit 50 calculates latent image contrasts C0 to C5 corresponding to the light amounts. At this time, in this embodiment, the light amounts of the six stages are set to E0: 100%, E1: 120%, E2: 140%, E3: 160%, E4: 180%, and E5: 200% of a light amount used in the normal mode. That is, the light amount E0 is the light amount of the exposure device 3 in the normal mode. The latent image contrast C0 is latent image contrast in the normal mode.

Figure 11:
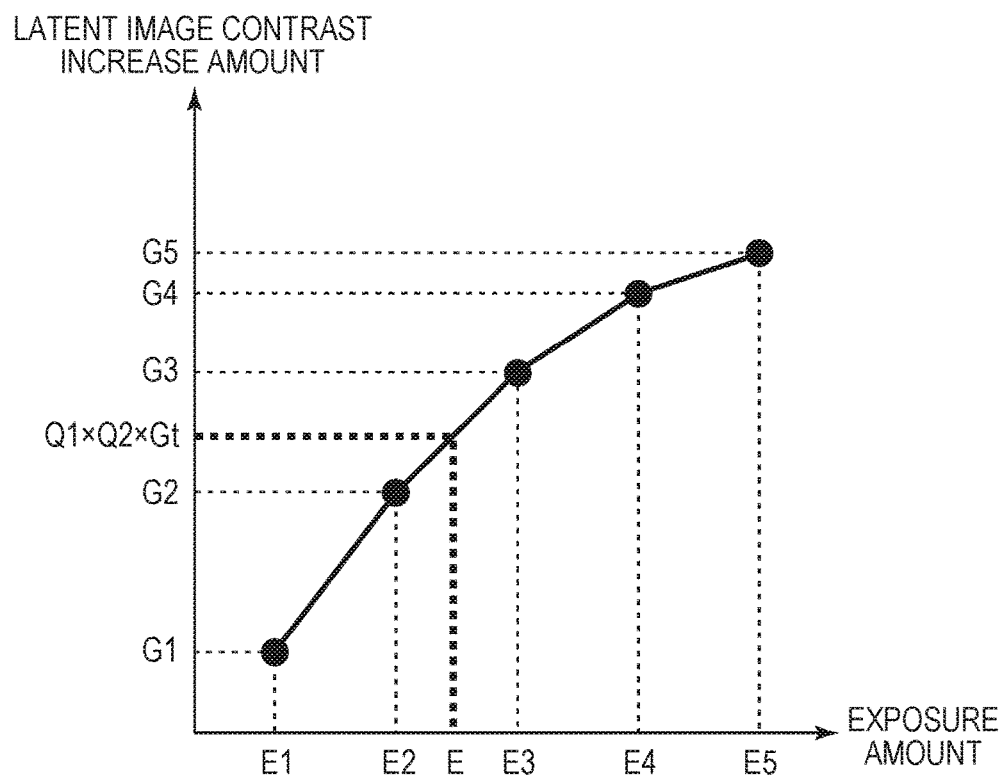
FIG. 11 is a graph for describing an exposure-amount determining method in the wide color gamut mode.

Subsequently, the control unit 50 calculates differences G1 to G5 between the latent image contrasts C1 to C5 and the latent image contrast C0. That is, the differences G1 to G5 are latent image contrast increase amounts from the normal mode at the time when the light amount of the exposure device 3 is increased. FIG. 11 is a graph illustrating a relation between the light amounts E1 to E5 of the exposure device 3 and the differences G1 to G5. In this embodiment, the light amount of the exposure device 3 is controlled based on the relation such that a preset target value of a predetermined latent image contrast increase amount (referred to as "target latent image contrast increase amount" as well) Gt can be obtained for each image forming unit P (or process cartridge 7). In this embodiment, the target latent image contrast increase amount Gt is calculated by an experiment in advance to make a color gamut enlargement effect effective and stored in the cartridge memory 84.

In this embodiment, in the wide color gamut mode, only setting of the light amount of the exposure device 3 is changed from the setting of the normal mode. Setting of a charging voltage and a developing voltage is not changed. Therefore, as it is seen from FIG. 10, an increase width of latent image contrast and an increase width of development contrast are the same. In this embodiment, the development contrast is compensated by electric charges of the toner adhering to the exposed portion on the photosensitive drum 1. Therefore, a latent image contrast increase amount and an increase amount of the toner adhering to the exposed portion on the photosensitive drum 1 are proportional. That is, it is possible to control the increase amount of the toner adhering to the exposed portion on the photosensitive drum 1 by controlling the latent image contrast increase amount.

A charging amount of the toner is different depending on an atmospheric environment or a degree of use of the toner. That is, an increase amount of the toner adhering to the exposed portion on the photosensitive drum 1 with respect to the same latent image contrast increase amount is different depending on the atmospheric environment or the degree of use of the toner. Therefore, in this embodiment, the target latent image contrast increase amount Gt is corrected based on information concerning the charging amount of the toner. Specifically, in this embodiment, the target latent image contrast increase amount Gt is corrected by a correction coefficient Q1 based on the atmospheric environment and a correction coefficient Q2 based on the degree of use of the toner. "Q1×Q2×Gt" is set as a target latent image contrast increase amount after the correction. A light amount of the exposure device 3 with which the target latent image contrast increase amount Q1×Q2×Gt after the correction is obtained is calculated based on the relation illustrated in FIG. 11.

In this embodiment, the control unit 50 calculates, based on temperature and humidity of an atmospheric environment detected by the environment sensor 31, a moisture content and determines the correction coefficient Q1 according to the calculated moisture content. In this embodiment, information concerning a toner use degree (a toner deterioration degree) is stored in the cartridge memory 84 as information concerning a degree of use of the toner for each process cartridge 7. That is, a charging amount of the toner decreases according to extrication of an extraneous additive due to agitation in the developing device 4. Therefore, the decrease of the charging amount of the toner can be predicted based on information correlated to a use amount of the developing device 4 (the process cartridge 7). In this embodiment, the control unit 50 successively integrates the number of sheets printed using the developing device 4 and causes the cartridge memory 84 functioning as a counting unit (a counter) to store the number of printed sheets information correlated to the use amount of the developing device 4. The control unit 50 calculates "a toner use degree (a toner deterioration degree) [%]", which is a ratio of the present number of printed sheets to the number of printed sheets set in advance as the life of the toner and successively causes the cartridge memory 84 to store the toner use degree. The control unit 50 determines the correction coefficient Q2 according to the toner use degree stored in the cartridge memory 84. As the information correlated with the use amount of the developing device 4, a driving time of the developing device 4 (a rotation time of the developing roller 41 or an agitating member in the developing device 4) may be used.

Specifically, in this embodiment, the control unit 50 respectively determines the correction coefficients Q1 and Q2 according to the preset information indicating the relations illustrated in Tables 2 and 3. That is, as illustrated in Table 2, the correction coefficient Q1 is set to be smaller as the moisture content (humidity) is larger (i.e., the toner charging amount is smaller). As illustrated in Table 3, the correction coefficient Q2 is set to be smaller as the toner use degree is larger (i.e., the toner charging amount is smaller). Linear interpolation is performed among moisture contents and toner use degrees illustrated in Tables 2 and 3. The information of Tables 2 and 3 is stored in the memory 52.

TABLE 2

| | Moisture content | | |
|---|---|---|---|
| | 21.2 [g/m$^3$] | 8.9 [g/m$^3$] | 1.1 [g/m$^3$] |
| Q1 | 0.75 | 1 | 1.25 |

TABLE 3

| | Toner use degree | | |
|---|---|---|---|
| | 0% | 50% | 100% |
| Q2 | 1 | 0.85 | 0.8 |

The control unit 50 performs linear interpolation using two points across the target latent image contrast increase amount Q1×Q2×Gt among the latent image contrast increase amounts G1 to G5. Consequently, the control unit 50 calculates the light amount E of the exposure device 3 with which the target latent image contrast increase amount Q1×Q2×Gt can be obtained. In the case of the example illustrated in FIG. 11, the control unit 50 calculates the light amount E of the exposure device 3 according to Expression 24 described below using G2, G3, E2 and E3.

$$E=E2+(E3-E2)\times(Q1\times Q2\times Gt-G2)\div(G3-G2) \quad \text{Expression 24}$$

The control unit 50 causes the memory 52 to store the calculated light amount of the exposure device 3 as setting of a light amount of the exposure device 3 in the wide color gamut mode until the next adjustment and ends the adjusting operation.

3. Execution Timing

In this embodiment, when the wide color gamut mode is designated from the operation unit 82 or an external apparatus such as a personal computer connected to the image forming apparatus 100, the adjusting operation for the image forming condition in the wide color gamut mode is performed during the pre-rotation process prior to the image forming operation.

4. Effects

Table 4 illustrates a relation among a latent image contrast increase amount in the wide color gamut mode, a toner increase amount, and an image evaluation result in this embodiment and a comparative example. In the comparative example, the latent image contrast in the wide color gamut mode was uniformly increased by 100 V from the latent image contrast in the normal mode irrespective of a degree of use of the toner and an atmospheric environment. The configuration and the operation of an image forming apparatus in the comparative example are substantially the same as the configuration and the operation of the image forming apparatus in this embodiment except the point described above. An image evaluation was performed respectively in a low-temperature low-humidity environment (a moisture content 1.1 g/m³), a normal-temperature normal-humidity environment (a moisture content 8.9 g/m³), and a high-temperature high-humidity environment (a moisture content 21.2 g/m³). The image evaluation was performed respectively using new toner (a toner use degree 0%) and durable toner (a toner use degree 100%) in the environments.

TABLE 4

|  |  | Comparative example | | This embodiment | |
| --- | --- | --- | --- | --- | --- |
|  |  | New toner | Durable toner | New toner | Durable toner |
| Low-temperature low-humidity environment | Latent image contrast increase amount | 100 [V] | 100 [V] | 125 [V] | 100 [V] |
|  | Toner increase amount | 0.24 [g/cm²] | 0.3 [g/cm²] | 0.3 [g/cm²] | 0.3 [g/cm²] |
|  | Problem | Color gamut enlargement insufficiency due to excessively small amount of toner | No problem | No problem | No problem |
| Normal-temperature normal-humidity environment | Latent image contrast increase amount | 100 [V] | 100 [V] | 100 [V] | 75 [V] |
|  | Toner increase amount | 0.3 [g/cm²] | 0.38 [g/cm²] | 0.3 [g/cm²] | 0.3 [g/cm²] |
|  | Problem | No problem | Fixing failure due to excessively large amount of toner | No problem | No problem |
| High-temperature high-humidity environment | Latent image contrast increase amount | 100 [V] | 100 [V] | 75 [V] | 60 [V] |
|  | Toner increase amount | 0.4 [g/cm²] | 0.5 [g/cm²] | 0.3 [g/cm²] | 0.3 [g/cm²] |
|  | Problem | Fixing failure due to excessively large amount of toner | Fixing failure due to excessively large amount of toner | No problem | No problem |

In the comparative example, it was seen that a problem due to excess or insufficiency of an increase amount of the toner adhering to the exposed portion on the photosensitive drum 1 in the wide color gamut mode was likely to occur. That is, under the low-temperature low-humidity environment, because a charging amount of the toner rose, the increase amount of the toner was insufficient with a uniform latent image contrast increase amount and a color gamut enlargement effect was likely to be insufficient. Under the high-temperature high-humidity environment or when the durable toner was used, the increase amount of the toner was excessive with the uniform latent image contrast increase amount and a fixing failure was likely to occur due to decrease of the charging amount of toner. There was also a concern about occurrence of a transfer failure.

On the other hand, in this embodiment, the toner increase amount in the wide color gamut mode is kept substantially constant irrespective of an atmospheric environment and a charging amount of the toner. Therefore, there was no influence on the color gamut enlargement effect, transfer, and fixing.

In this way, in this embodiment, the image forming apparatus 100 is capable of performing image formation in a plurality of modes in which target values of a difference between the potential of the unexposed portion and the potential of the exposed portion are different. The control unit 50 controls an image forming condition in a mode in which a target value of the difference is relatively large among the plurality of modes such that differences of the difference among the plurality of modes approaches a predetermined value. In this embodiment, the control unit 50 corrects the predetermined value based on information concerning a charging amount of the toner. In this embodiment, the information concerning the charging amount of the toner is based on information concerning a degree of use of the toner. In this embodiment, the information concerning the charging amount of the toner is based on information concerning an atmospheric environment.

As described above, according to this embodiment, it is possible to prevent insufficiency of an effect of the color gamut enlargement mode from occurring because a toner amount increases less than expected and prevent transfer failure or fixing failure from occurring because the toner amount increases more than expected.

In this embodiment, the same control as the control in the first embodiment is used as the latent-image-contrast detection control. However, in this embodiment, the same control as the control in the second embodiment may be used or the control in the modification of the first embodiment or the second embodiment may be used.

[Others]

The present invention is described above with reference to the specific embodiments. However, the present invention is not limited to the embodiments described above.

For example, in the embodiments described above, the control target image forming condition is the setting of the light amount of the exposure unit. However, the present invention is not limited to this. The control target image forming condition may be, for example, a charging voltage or a developing voltage.

The information described as the information stored in the cartridge memory in the embodiments may be stored in a memory unit provided in the apparatus main body of the image forming apparatus.

The target latent image contrast in the first and second embodiments can also be corrected according to the toner use degree and the atmospheric environment as in the third embodiment.

In the embodiments described above, the present invention is applied to the image forming apparatus including the plurality of image forming units. However, the present invention can also be applied to an image forming apparatus including a single image forming unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-134183, filed Jul. 7, 2017, which is hereby incorporated by reference herein in its entirety.

What is claimed is:

1. An image forming apparatus comprising:
   a photosensitive member;
   a charging member configured to charge the photosensitive member to form an unexposed portion on the photosensitive member;
   an exposure device configured to expose the photosensitive member charged by the charging member to form an exposed portion on the photosensitive member;
   a voltage applying member configured to apply a voltage to the photosensitive member;
   a detecting unit configured to detect a value of a current flowing to the photosensitive member when a voltage is supplied to the voltage applying member or a value of a voltage applied to the photosensitive member when a current is supplied to the voltage applying member;
   an acquiring unit configured to acquire information concerning a difference between potential of the unexposed portion and potential of the exposed portion, based on detection results of the detecting unit at times when the voltage is applied by the voltage applying member to each of the unexposed portion formed in a region chargeable by the charging member in and the exposed portion formed in a region exposable by the exposure device; and
   a control unit configured to control an image forming condition based on the information concerning the difference.

2. The image forming apparatus according to claim 1, wherein
   when the acquiring unit acquires the information concerning the difference, the voltage applied to the photosensitive member by the voltage applying member is only a voltage having a same polarity as a polarity of a voltage applied to the photosensitive member by the voltage applying member during image formation.

3. The image forming apparatus according to claim 1, wherein
   the acquiring unit calculates, based on a relation between a current value and a voltage value acquired based on a detection result of the detecting unit by applying a plurality of different voltages to the unexposed portion with the control unit and a relation between a current value and a voltage value acquired based on a detection result of the detecting unit by applying a plurality of different voltages to the exposed portion, a difference between voltages at times when predetermined currents flow respectively to the unexposed portion and the exposed portion and acquires, based on the difference between the voltage, information concerning the difference.

4. The image forming apparatus according to claim 1, wherein
   the control unit controls the difference to approach a target value.

5. The image forming apparatus according to claim 1, wherein
   the control unit controls a light amount of the exposure device as the image forming condition.

6. The image forming apparatus according to claim 5, wherein
   the control unit controls, based on a relation between a light amount of the exposure device acquired by controlling a light amount of the exposure device at a time when the exposed portion is formed and the difference, the light amount of the exposure device such that the difference approaches a target value.

7. The image forming apparatus according to claim 1, wherein
   the control unit controls the image forming condition at predetermined timing corresponding to information concerning a degree of use of the photosensitive member.

8. The image forming apparatus according to claim 1, wherein
the control unit controls the image forming condition at predetermined timing corresponding to information concerning an atmospheric environment.

9. The image forming apparatus according to claim 1, wherein
the image forming apparatus is capable of performing image formation in a plurality of modes in which a target value of the difference is different, and
the control unit controls an image forming condition in a mode in which the target value of the difference is relatively large among the plurality of modes such that differences of the difference among the plurality of modes approach a predetermined value.

10. The image forming apparatus according to claim 9, wherein
the control unit corrects the predetermined value based on information concerning a charging amount of toner.

11. The image forming apparatus according to claim 10, wherein
the information concerning the charging amount of the toner is based on information concerning a degree of use of the toner.

12. The image forming apparatus according to claim 10, wherein
the information concerning the charging amount of the toner is based on information concerning an atmospheric environment.

13. The image forming apparatus according to claim 1, wherein
the voltage applying member is a transfer member configured to transfer a toner image from the photosensitive member to a transfer body.

14. The image forming apparatus according to claim 1, further comprising:
a plurality of image forming units including the photosensitive member, the charging member, the exposure device, and the voltage applying member; and
the detecting unit common to the plurality of image forming units, the detecting unit detecting a value of a current flowing to a plurality of the photosensitive members when a voltage is supplied to the voltage applying members respectively provided in the plurality of photosensitive members or a value of a voltage applied to the plurality of photosensitive members when a current is supplied to the voltage applying members respectively provided in the plurality of photosensitive members, wherein
the acquiring unit acquires information concerning the difference in each of the plurality of photosensitive members, and the control unit controls an image forming condition concerning each of the plurality of photosensitive members.

15. The image forming apparatus according to claim 14, wherein
when a number of the plurality of photosensitive members is represented as n, the acquiring unit acquires, based on a detection result of the detecting unit at a time when a voltage is simultaneously applied to the unexposed portions on the n photosensitive members, respective detection results of the detecting unit at a time when a voltage is simultaneously applied to the exposed portions or the unexposed portions on the plurality of photosensitive members when the number of the photosensitive members forming the exposed portion is sequentially changed from 1 to n and the exposed portions or the unexposed portions are formed on surfaces of the respective photosensitive members, and information concerning a degree of use of each of the plurality of photosensitive members, information concerning the difference in each of the plurality of photosensitive members, n being an integer equal to or greater than 2.

16. An image forming apparatus comprising:
a photosensitive member;
a charging member configured to charge the photosensitive member;
an exposure device configured to expose the photosensitive member charged by the charging member to form an electrostatic image on the photosensitive member;
a voltage applying member configured to apply a voltage to the photosensitive member;
a detecting unit configured to detect a value of a current flowing to the photosensitive member when a voltage is supplied to the voltage applying member or a value of a voltage applied to the photosensitive member when a current is supplied to the voltage applying member;
an acquiring unit configured to acquire information concerning a difference between potential of a first portion not to be formed with the electrostatic image on the photosensitive member and potential of a second portion formed with the electrostatic image on the photosensitive member, based on detection results of the detecting unit at times when the voltage is applied by the voltage applying member to each of the first portion and the second portion on the photosensitive member; and
a control unit configured to control an image forming condition based on the information concerning the difference.

* * * * *